US010919615B2

(12) United States Patent
Goett

(10) Patent No.: US 10,919,615 B2
(45) Date of Patent: Feb. 16, 2021

(54) METHODS AND APPARATUSES FOR JOINING TITANIUM AND TITANIUM ALLOY STRUCTURES TO EPOXY-CONTAINING COMPOUNDS

(71) Applicant: THE BOEING COMPANY, Chicago, IL (US)

(72) Inventor: Gregory A. Goett, Chicago, IL (US)

(73) Assignee: The Boeing Company, Chicago, IL (US)

( * ) Notice: Subject to any disclaimer, the term of this patent is extended or adjusted under 35 U.S.C. 154(b) by 694 days.

(21) Appl. No.: 15/472,709

(22) Filed: Mar. 29, 2017

(65) Prior Publication Data

US 2018/0281925 A1    Oct. 4, 2018

(51) Int. Cl.
| | | |
|---|---|---|
| *B64C 5/02* | (2006.01) | |
| *B29C 65/48* | (2006.01) | |
| *B32B 7/12* | (2006.01) | |
| *B32B 15/092* | (2006.01) | |
| *C22C 14/00* | (2006.01) | |
| *C22C 22/00* | (2006.01) | |
| *B32B 27/04* | (2006.01) | |
| *C23C 22/05* | (2006.01) | |
| *B29C 65/00* | (2006.01) | |
| *B32B 27/20* | (2006.01) | |
| *B32B 7/00* | (2019.01) | |
| *B32B 7/04* | (2019.01) | |
| *B32B 27/00* | (2006.01) | |
| *B32B 33/00* | (2006.01) | |
| *B32B 27/38* | (2006.01) | |

(Continued)

(52) U.S. Cl.
CPC ............... *B64C 5/02* (2013.01); *B29C 65/48* (2013.01); *B29C 66/712* (2013.01); *B29C 66/721* (2013.01); *B29C 66/742* (2013.01); *B32B 7/00* (2013.01); *B32B 7/04* (2013.01); *B32B 7/12* (2013.01); *B32B 15/00* (2013.01); *B32B 15/092* (2013.01); *B32B 27/00* (2013.01); *B32B 27/20* (2013.01); *B32B 27/38* (2013.01); *B32B 33/00* (2013.01); *C22C 14/00* (2013.01); *C23C 22/05* (2013.01); *B29K 2663/00* (2013.01); *B29K 2705/00* (2013.01); *B29L 2031/3002* (2013.01); *B32B 2255/06* (2013.01); *B32B 2605/00* (2013.01)

(58) Field of Classification Search
None
See application file for complete search history.

(56) References Cited

U.S. PATENT DOCUMENTS 5,297,760 A * 3/1994 Hart-Smith ............. B64C 1/068
244/132
5,814,137 A    9/1998 Blohowiak et al.
(Continued)

OTHER PUBLICATIONS

Superior bonding performance—Loctite paste adhesives p. 40-43. (Year: 2015).*

(Continued)

*Primary Examiner* — Ramsey Zacharia
(74) *Attorney, Agent, or Firm* — Coats & Bennett, PLLC

(57) ABSTRACT

Adhesion of a metal surfaces (e.g. titanium and titanium alloys) to an epoxy resin is improved by creating a sol-gel layer at the metal/epoxy resin surface, with the sol-gel comprising a mixture of organometallic compounds to react with or bond to both the metal surfaces and an interfacing epoxy resin.

43 Claims, 13 Drawing Sheets

(51) Int. Cl.
    *B32B 15/00*     (2006.01)
    *B29K 705/00*     (2006.01)
    *B29K 663/00*     (2006.01)
    *B29L 31/30*     (2006.01)

(56) References Cited

U.S. PATENT DOCUMENTS

| | | |
|---|---|---|
| 5,849,110 A | 12/1998 | Blohowiak et al. |
| 5,869,140 A | 2/1999 | Blohowiak et al. |
| 5,869,141 A | 2/1999 | Blohowiak et al. |
| 5,939,197 A | 8/1999 | Blohowiak et al. |
| 6,037,060 A | 3/2000 | Blohowiak et al. |
| 6,506,499 B1 | 1/2003 | Blohowiak et al. |
| 6,768,048 B2 | 7/2004 | Woll et al. |
| 6,796,702 B2 | 9/2004 | Wire et al. |
| 7,563,513 B2 | 7/2009 | Krienke et al. |
| 8,592,042 B2 | 11/2013 | Blohowiak et al. |
| 2003/0024432 A1 | 2/2003 | Chung et al. |
| 2008/0050598 A1* | 2/2008 | Bateman ................ B05D 3/107 428/426 |
| 2011/0300358 A1* | 12/2011 | Blohowiak ............... B32B 5/12 428/215 |

OTHER PUBLICATIONS

Advance Chemistry & Technology—AC-® 130. (Year: 2006).*
European Office Action—dated Sep. 20, 2018 issued in corresponding European Application No. 18156635, 8 pages.

* cited by examiner

METHODS AND APPARATUSES FOR JOINING TITANIUM AND TITANIUM ALLOY STRUCTURES TO EPOXY-CONTAINING COMPOUNDS

TECHNOLOGICAL FIELD

The present disclosure relates generally to the field of bonding metals to non-metals. More specifically, the present disclosure is directed to methods, systems and apparatuses for joining titanium and titanium alloy structures to epoxy-containing compounds. Still more specifically, the present disclosure relates to methods, system and apparatuses for joining titanium and titanium alloy structures to epoxy-containing compounds comprising depositing a sol-gel layer to a titanium or titanium alloy structure surface.

BACKGROUND

Joining metal structure surfaces to composite structure surfaces and epoxy-containing surfaces at high-load locations on structures presents various challenges. This is especially true when the metal is known to possess characteristics that make adhering the metal to, for example, a non-metal substrate difficult. Such metals that are typically difficult to adhere adequately to other metal and non-metal surfaces (e.g. the composite structure surfaces comprising an epoxy-containing material) for high load bearing application include titanium and titanium alloys. Various solutions to these challenges have involved including intermediary material layers to which both the composite structure surface and the metal structure surface may bond. Such methods have enjoyed success. However, at various high-load locations, for example, locations on aircraft, including, without limitation, horizontal stabilizer assemblies, joining metal structure surfaces to composite surfaces is critical and must endure a significant life cycle extending beyond, for example, several decades. Taking such structures out of service for repair is time-consuming and costly. In addition, introducing intermediary material to facilitate titanium and titanium alloy bonding to, for example, composite materials can add undesirable weight to certain structures including, for example, aircraft, spacecraft, rotorcraft, etc.

Obtaining a proper interface for a resin material at the surface of a metal has been an area of concern that has been the subject of considerable research. Standard metal surface treatments yield a surface that lacked many sites that are friendly with the binding sites typically available in the resin material. Such bonding sites typically bonded through covalent bonds, hydrogen bonds, or through van der Walls forces. A coupling agent for the resin and metal was often required to improve adhesion.

SUMMARY

Aspects of the present disclosure comprise improving adhesion of a metal surface (e.g. titanium surface and titanium alloy surface) to an epoxy resin by creating a sol-gel film at the interface between the metal surface and the epoxy resin. A metal-to-resin gradient occurs through a monolayer of organometallic coupling agents.

Further aspects of the present disclosure are directed to a method of joining a titanium structure to a composite structure comprising positioning a first titanium structure comprising a first titanium structure surface, said first titanium structure surface comprising a first sol-gel layer; positioning a composite structure, said composite structure comprising a composite structure first surface and a composite structure second surface, said composite structure first surface positioned proximate to and at a predetermined distance from said first titanium structure surface; positioning a predetermined amount of an epoxy-containing compound between the sol-gel layer and the composite structure first surface; bonding the epoxy-containing compound to the first titanium structure surface; and joining the first titanium structure to the composite structure to form a multi-layer structure.

In another aspect, after the step of positioning a predetermined amount of an epoxy-containing compound between the first sol-gel layer and the composite structure first surface, further comprising curing the epoxy-containing compound.

Further aspects of the present disclosure are directed to a method of joining a titanium structure to a composite structure comprising positioning a first titanium structure comprising a first titanium structure surface, said first titanium structure surface comprising first a sol-gel layer; positioning a second titanium structure comprising a second titanium structure surface, said second titanium structure surface comprising a second sol-gel layer; positioning a composite structure, said composite structure comprising a composite structure first surface and a composite structure second surface, said composite structure first surface positioned proximate to and at a predetermined distance from said first titanium structure surface, and said composite structure second surface positioned proximate to and at a predetermined distance from said second titanium structure surface; positioning a predetermined amount of an epoxy-containing compound between the first sol-gel layer and the composite structure first surface; and positioning a predetermined amount of epoxy-containing compound between the second sol-gel layer and the composite structure second surface; wherein the first titanium structure and the second titanium structure are joined to the composite structure to form a multi-layer structure.

In another aspect, after the steps of positioning a predetermined amount of an epoxy-containing compound between the first sol-gel layer and the composite structure first surface; and positioning a predetermined amount of epoxy-containing compound between the second sol-gel layer and the composite structure second surface, further comprising curing the epoxy-containing compound.

A further aspect contemplates, before the step of positioning a composite structure, further comprising applying a sol-gel layer to at least the first titanium structure surface.

A further aspect contemplates, before the step of positioning a composite structure, further comprising applying a coating to the sol-gel layer on at least the first titanium structure surface.

A further aspect contemplates, before the step of positioning a composite structure, further comprising applying a sol-gel layer to the second titanium structure surface.

A further aspect contemplates, before the step of positioning a composite structure, further comprising applying a coating to the sol-gel layer on the second titanium structure surface.

In another aspect, after the step of positioning a predetermined amount of an epoxy-containing compound between the first sol-gel layer and the composite structure first surface, further comprising curing the epoxy-containing compound.

In another aspect, in the steps of exposing at least a first titanium structure, the titanium comprises titanium, a titanium alloy, or combinations thereof.

In a further aspect, in the steps of exposing at least a first titanium structure, the titanium alloy comprises Ti-6Al-4V; Ti-15V-3Cr-3Sn-3Al; Ti-15Mo-3Al-3Nb, etc. or combinations thereof.

In another aspect, contemplated methods further comprise curing the multi-layer structure.

In another aspect, in the step of positioning at least a first titanium structure comprising a first titanium structure surface, the titanium structure comprises a splice plate component.

In another aspect, in the step of applying a sol-gel layer to at least first titanium structure surface the sol-gel layer comprises a dilute aqueous mixture of alkoxyzirconium, free of alcohol, for covalently bonding to the first titanium structure and the second titanium structure through the zirconium to form a metal-to-organic interface on the titanium structure surface; an organosilane coupling agent dissolved in the mixture; an organic acid as a catalyst and as a stabilizer of the hydrolysis rate of the alkoxyzirconium; and a predetermined amount of ammonia or ammonium hydroxide to disrupt the Z-acetate complex that otherwise forms.

In a further aspect, in the step of positioning a composite structure proximate to and at a predetermined distance from at least a first titanium structure surface, the composite structure comprises carbon fiber, glass fiber, boron fiber, aramid fiber, polyolefin fiber, ceramic fiber, or combinations thereof.

In another aspect, in the step of applying a predetermined amount of an epoxy-containing compound between the first sol-gel layer and the composite structure first surface, said epoxy-containing compound comprises a Grade 120 epoxy system, or Grade 190 epoxy system.

In another aspect, in the steps of positioning a predetermined amount of epoxy-containing compound between the first sol-gel layer and the composite structure first surface, and positioning a predetermined amount of epoxy-containing compound between the second sol-gel layer and the composite structure second surface, the epoxy-containing compound forms a moldable plastic shim.

In a further aspect, in the step of curing the multi-layer structure, the curing is conducted at a temperature ranging from about 120° F. to about 140° F.

A further aspect of the present disclosure is directed to a joined structure made according to a method of joining a titanium structure to a composite structure comprising positioning a first titanium structure comprising a first titanium structure surface, said first titanium structure surface comprising a sol-gel layer; positioning a composite structure, said composite structure comprising a composite structure first surface and a composite structure second surface, said composite structure first surface positioned proximate to and at a predetermined distance from said first titanium structure surface; positioning a predetermined amount of an epoxy-containing compound between the sol-gel layer and the composite structure first surface; bonding the epoxy-containing compound to the first titanium structure surface; and joining the first titanium structure to the composite structure to form a multi-layer structure.

In another aspect, in the step of applying a coating to the first titanium structure surface, the coating comprises an epoxy-containing compound.

In a further aspect, in the step of positioning a composite structure proximate to and at a predetermined distance from at least the first titanium structure surface, the composite structure comprises an epoxy resin.

A further aspect of the present disclosure is directed to an assembly comprising a first titanium structure comprising at least a first titanium structure surface; a sol-gel layer applied to the first titanium structure surface; a composite structure comprising a composite structure first surface and a composite structure second surface, said composite structure first surface positioned proximate to and at a predetermined distance from said first titanium structure surface, and a predetermined amount of an epoxy-containing compound positioned between the sol-gel layer applied to the first titanium structure surface and the composite structure first surface.

In a further aspect, the predetermined amount of an epoxy-containing compound positioned between the sol-gel layer applied to the first titanium structure surface and the composite structure first surface is bonded to the first titanium surface.

In another aspect, the assembly comprises a second titanium structure comprising a second titanium structure surface with a second sol-gel layer applied to the second titanium structure surface, and with the second composite structure surface positioned proximate to at a predetermined distance from the second titanium structure surface, and a predetermined amount of an epoxy-containing compound positioned between a second sol-gel layer applied to the second titanium structure surface and the composite structure second surface.

In another aspect, in the assembly, a predetermined amount of an epoxy-containing compound positioned between the sol-gel layer is applied to the second titanium structure surface and/or the composite structure second surface.

In another aspect, the at least first titanium structure is configured to form a fastener component.

In a further aspect, the at least first titanium structure comprises a splice plate component.

In a further aspect, the at least first titanium structure comprises titanium, a titanium alloy, or combinations thereof.

In another aspect, the at least first titanium structure comprises titanium, a titanium alloy comprising Ti-6Al-4V; Ti-15V-3Cr-3Sn-3Al; Ti-15Mo-3Al-3Nb, etc., or combinations thereof.

In another aspect, the composite structure comprises carbon fiber, glass fiber, boron fiber, aramid fiber, polyolefin fiber, ceramic fiber, or combinations thereof.

In a further aspect, the composite structure comprises an epoxy resin.

In another aspect, the epoxy-containing compound comprises a Grade 120 epoxy system or a Grade 190 epoxy system.

In another aspect, the epoxy-containing compound forms a moldable plastic shim.

In a further aspect, the assembly further comprises a coating configured to coat the sol-gel layer.

In another aspect, the coating comprises a primer.

Further aspects of the present disclosure contemplate a joined surface and/or a joint comprising any of the aforementioned assemblies, a stationary objects comprising the aforementioned assemblies, and a vehicle comprising any of the aforementioned assemblies, wherein the vehicles are selected from the group consisting of: a manned aircraft; an unmanned aircraft; a manned spacecraft; an unmanned spacecraft; a manned rotorcraft; an unmanned rotorcraft; a missile; a rocket; a manned terrestrial vehicle; an unmanned terrestrial vehicle; a manned surface water-borne vehicle; an unmanned surface water-borne vehicle; a manned sub-surface water-borne vehicle; and an unmanned sub-surface water-borne vehicle.

In another aspect, the sol-gel layer comprises a sol-gel comprising a dilute aqueous mixture of alkoxyzirconium, free of alcohol, for covalently bonding to the first titanium structure and the second titanium structure though the zirconium to form a metal-to-organic interface on the titanium structure surface; an organosilane coupling agent dissolved in the mixture; an organic acid as a catalyst and as a stabilizer of the hydrolysis rate of the alkoxyzirconium; and a predetermined amount of ammonia or ammonium hydroxide to disrupt the Z-acetate complex that otherwise forms.

In a further aspect, the sol-gel comprises an organosilane selected from the group consisting of:
3-amino propyltriethoxysilane;
3-glycidoxypropyltrimethoxysilane;
p-aminophenylsilane;
allyltrimethoxysilane;
n-(2-aminoethyl)-3-aminopropyltrimethoxysilane;
3-aminopropyltriethoxysilane;
3-aminopropyltrimethoxysilane;
3-glycidylpropyldiisopropylethoxysilane;
(3-glycidoxypropyl)methyldiethoxysilane;
3-glycidoxypropyltrimethyoxysilane;
3-mercaptopropyltrimethyoxysilane;
3-mercaptopropyltriethyoxysilane;
3-methacryloxypropylmethyldiethoxysilane;
3-methacryloxypropylmethyldimethoxysilane;
3-methacryloxypropyltrimethoxysilane;
n-phenylaminopropyltrimethoxysilane;
vinylmethyldiethoxysilane;
vinyltriethoxysilane; and
vinyltrimethoxysilane.

In another aspect, the sol-gel comprises a predetermined amount of a cerium-, yttrium-, titanium-, or a lanthanum-organometallic for bonding to the titanium, the organometallic present with or in place of the alkoxyzirconium.

In another aspect, in the sol-gel, the alkoxyzirconium is $(R-O)_4-Zr$, wherein R is a lower aliphatic having 2-5 carbon atoms, alicyclic, or aryl.

In another aspect, the alkoxyzirconium comprises about 1 vol % of the sol-gel

In a further aspect, the sol comprises an organosiloxane consisting of:
3-amino propyltriethoxysilane;
3-glycidoxypropyltrimethoxysilane
p-aminophenylsilane;
allyltrimethoxysilane;
n-(2-aminoethyl)-3-aminopropyltrimethoxysilane;
3-aminopropyltriethoxysilane;
3-aminopropyltrimethoxysilane;
3-glycidylpropyldiisopropylethoxysilane;
(3-glycidoxypropyl)methyldiethoxysilane;
3-glycidoxypropyltrimethyoxysilane;
3-mercaptopropyltrimethyoxysilane;
3-mercaptopropyltriethyoxysilane;
3-methacryloxypropylmethyldiethoxysilane;
3-methacryloxypropylmethyldimethoxysilane;
3-methacryloxypropyltrimethoxysilane;
n-phenylaminopropyltrimethoxysilane;
vinylmethyldiethoxysilane;
vinyltriethoxysilane; and vinyltrimethoxysilane In another aspect, the ratio of alkoxyzirconium to organosilane in the sol-gel is about 1 part alkoxyzirconium to about 2 parts organosilane by volume, and wherein the organic acid is acetic acid.

In another aspect, the ratio of alkoxyzirconium to organosilane in the sol-gel is about 1 part alkoxyzirconium to about 3.4 parts organosilane by volume, and wherein the organic acid is acetic acid.

In a further aspect, the assembly comprises a sol-gel comprising an organosiloxane, wherein the organosiloxane comprises glycidoxypropyltrimethyoxysilane.

In a further aspect, the assembly comprises a sol-gel comprising a dilute aqueous mixture of alkoxyzirconium, wherein the alkoxyzirconium comprises tetra-n-propoxyzirconium.

A further aspect of the present disclosure contemplates a joined surface comprising an assembly comprising a first titanium structure comprising at least a first titanium structure surface; a sol-gel layer applied to the first titanium structure surface; a composite structure comprising a composite structure first surface and a composite structure second surface, said composite structure first surface positioned proximate to and at a predetermined distance from said first titanium structure surface, and a predetermined amount of an epoxy-containing compound positioned between the sol-gel layer applied to the first titanium structure surface and the composite structure first surface In another aspect, the joined surface comprises a second titanium structure comprising a second titanium structure surface.

In a further aspect, the joined surface comprises a sol-gel layer applied to the second titanium structure surface.

In another aspect, in the joined surface, the composite structure second surface is positioned proximate to and at a predetermined distance from said second titanium structure surface.

In another aspect, the joined surface comprises a predetermined amount of an epoxy-containing compound positioned between the sol-gel layer is applied to the second titanium structure surface and/or the composite structure second surface.

In another aspect, the joined surface comprises a sol-gel layer applied to the second titanium structure surface.

In a further aspect, the joined surface comprises a composite structure second surface positioned proximate to and at a predetermined distance from said second titanium structure surface.

In a further aspect, the joined surface comprises a predetermined amount of an epoxy-containing compound is positioned between the sol-gel layer and the composite structure second surface is applied to the sol-gel layer and/or the composite structure second surface.

A further aspect is directed to a horizontal stabilizer comprising an assembly, with the assembly comprising at least a first titanium structure comprising at least a first titanium structure surface; a sol-gel layer applied to the first titanium structure surface; a composite structure comprising a composite structure first surface and a composite structure second surface, said composite structure first surface positioned proximate to and at a predetermined distance from said first titanium structure surface; and a predetermined amount of an epoxy-containing compound oriented between the sol-gel layer applied to the first titanium structure surface and the composite structure first surface.

In another aspect, the horizontal stabilizer comprises a second titanium structure comprising a second titanium structure surface.

In a further aspect, the horizontal stabilizer comprises at least one sol-gel layer applied to the second titanium structure surface.

In another aspect, in the horizontal stabilizer, the composite structure second surface is positioned proximate to and at a predetermined distance from said second titanium structure surface.

In another aspect, in the horizontal stabilizer, a predetermined amount of an epoxy-containing compound positioned between the sol-gel layer is applied to the second titanium structure surface and/or the composite structure second surface.

In another aspect, in the horizontal stabilizer, the at least first titanium structure is configured to form a fastener component.

In a further aspect, in the horizontal stabilizer, the at least first titanium structure comprises a splice plate component.

In another aspect, the first and second titanium structures join to form a joint.

In a further aspect, in the horizontal stabilizer, the at least first titanium structure comprises titanium, a titanium alloy, or combinations thereof.

In another aspect, in the horizontal stabilizer, the at least first titanium structure comprises titanium, a titanium alloy comprising Ti-6Al-4V; Ti-15V-3Cr-3Sn-3Al; Ti-15Mo-3Al-3Nb, etc., or combinations thereof.

In another aspect, in the horizontal stabilizer, the composite structure comprises carbon fiber, glass fiber, boron fiber, aramid fiber, polyolefin fiber, ceramic fiber, or combinations thereof.

In a further aspect, in the horizontal stabilizer the composite structure comprises an epoxy resin.

In another aspect, in the horizontal stabilizer, the epoxy-containing compound comprises a Grade 120 epoxy system or a Grade 190 epoxy resin system.

In another aspect, in the horizontal assembly, the epoxy-containing compound forms a moldable plastic shim.

In a further aspect, the horizontal stabilizer further comprises a coating configured to coat the sol-gel layer.

In another aspect, the coating comprises a primer.

A further aspect is directed to an object comprising an assembly comprising comprising at least a first titanium structure comprising at least a first titanium structure surface; a sol-gel layer applied to the first titanium structure surface; a composite structure comprising a composite structure first surface and a composite structure second surface, said composite structure first surface positioned proximate to and at a predetermined distance from said first titanium structure surface; and a predetermined amount of an epoxy-containing compound positioned between the sol-gel layer applied to the first titanium structure surface and/or the composite structure first surface.

In a further aspect, the object is a stationary object.

In another aspect, the object is a vehicle.

In a further aspect, the object is a vehicle, with the vehicle selected from the group consisting of: a manned aircraft; an unmanned aircraft; a manned spacecraft; an unmanned spacecraft; a manned rotorcraft; an unmanned rotorcraft; a missile; a rocket; a manned terrestrial vehicle; an unmanned terrestrial vehicle; a manned surface water-borne vehicle; an unmanned surface water-borne vehicle; a manned sub-surface water-borne vehicle; and an unmanned sub-surface water-borne vehicle.

BRIEF DESCRIPTION OF THE DRAWINGS

Figure 1A:
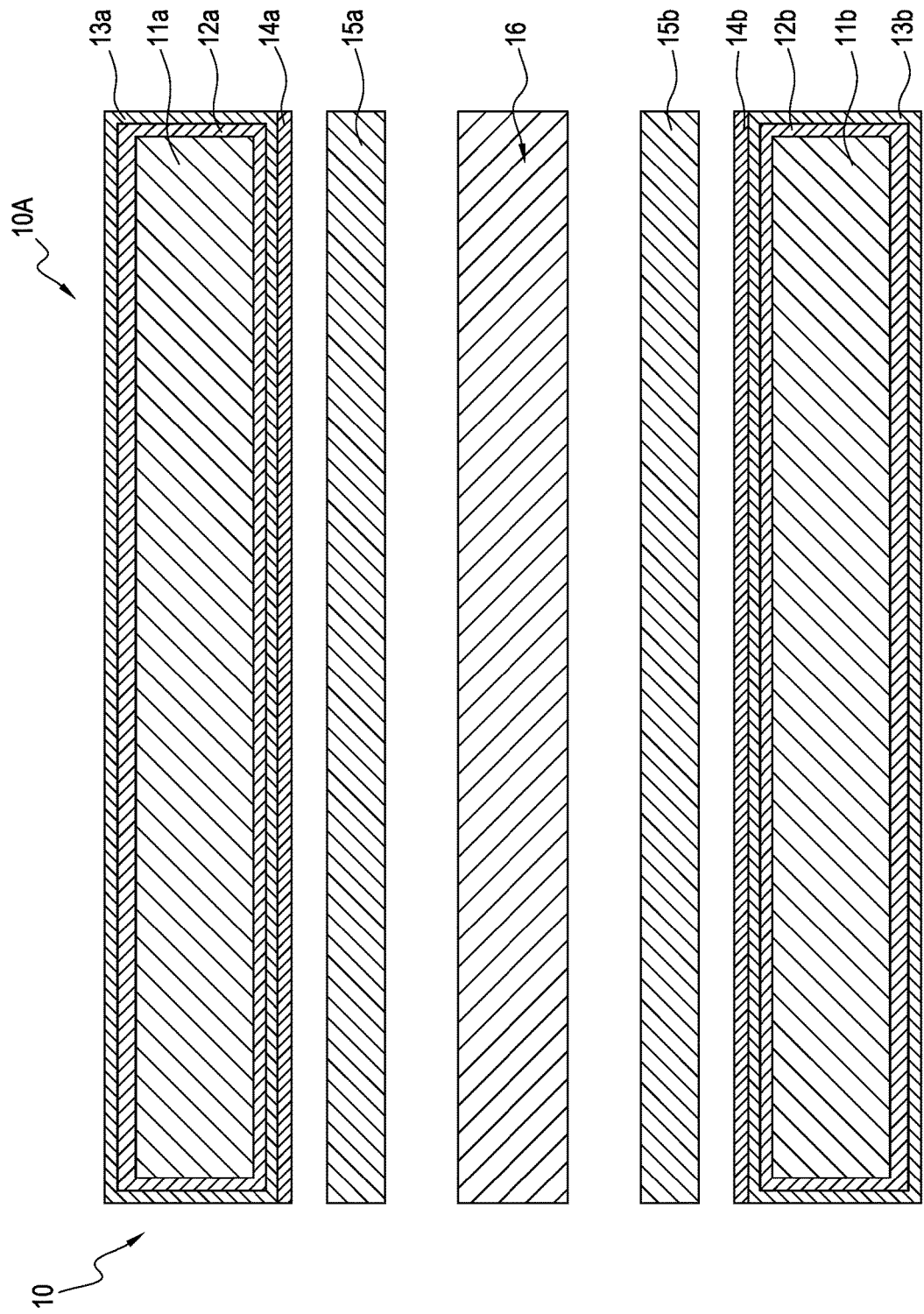
Figure 2A:
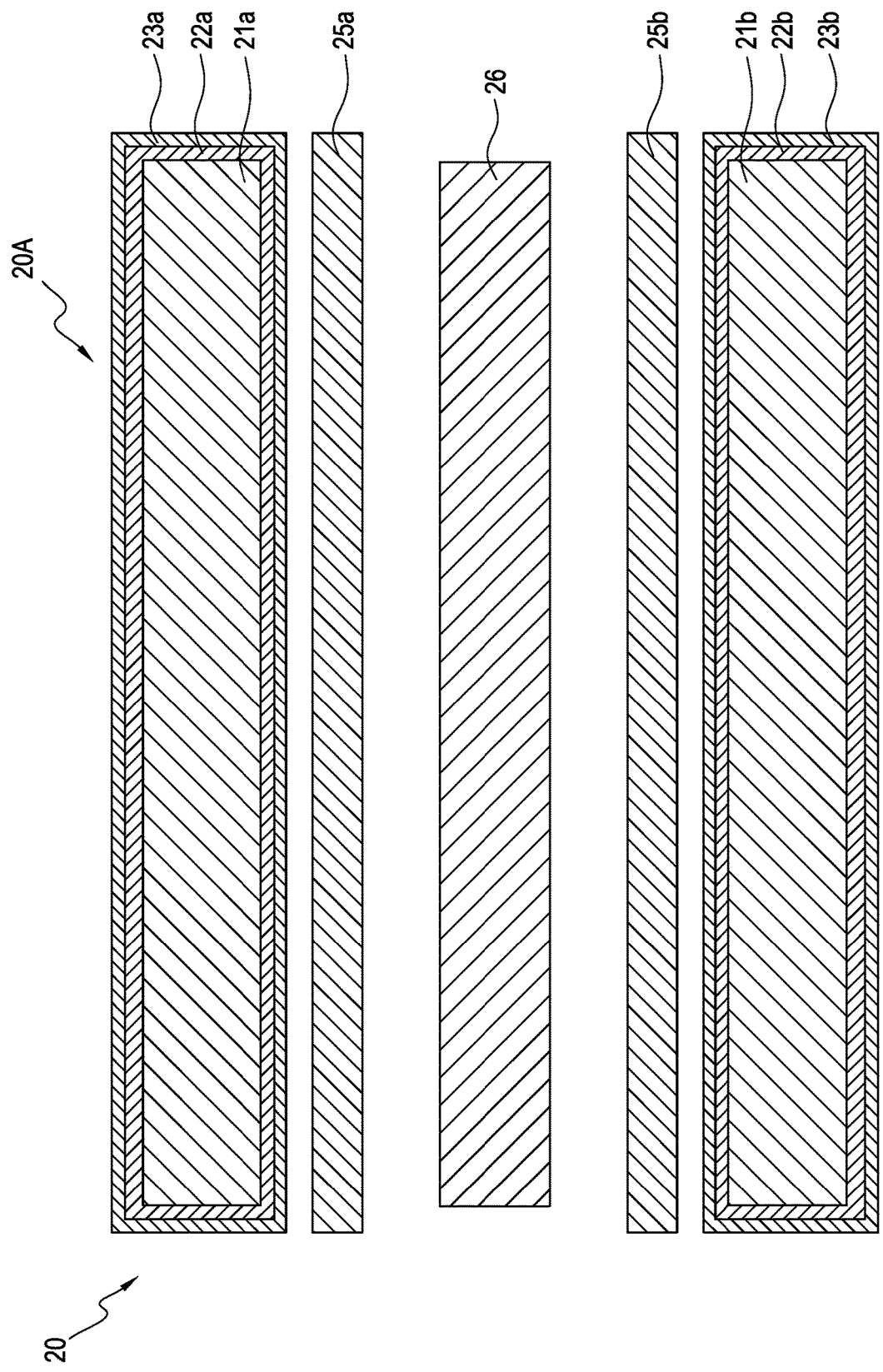
Figure 1B:
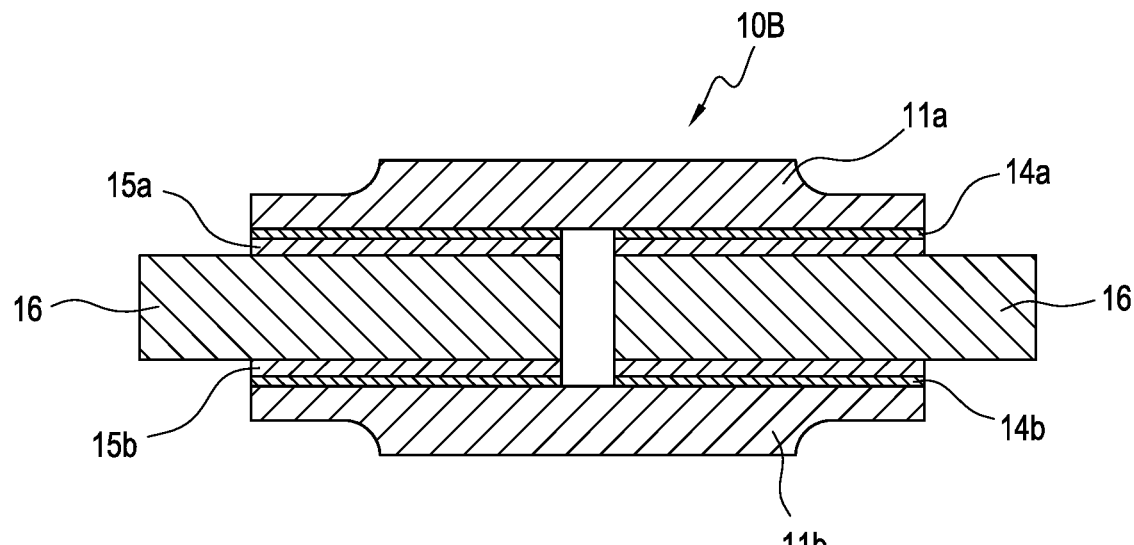
Figure 2B:
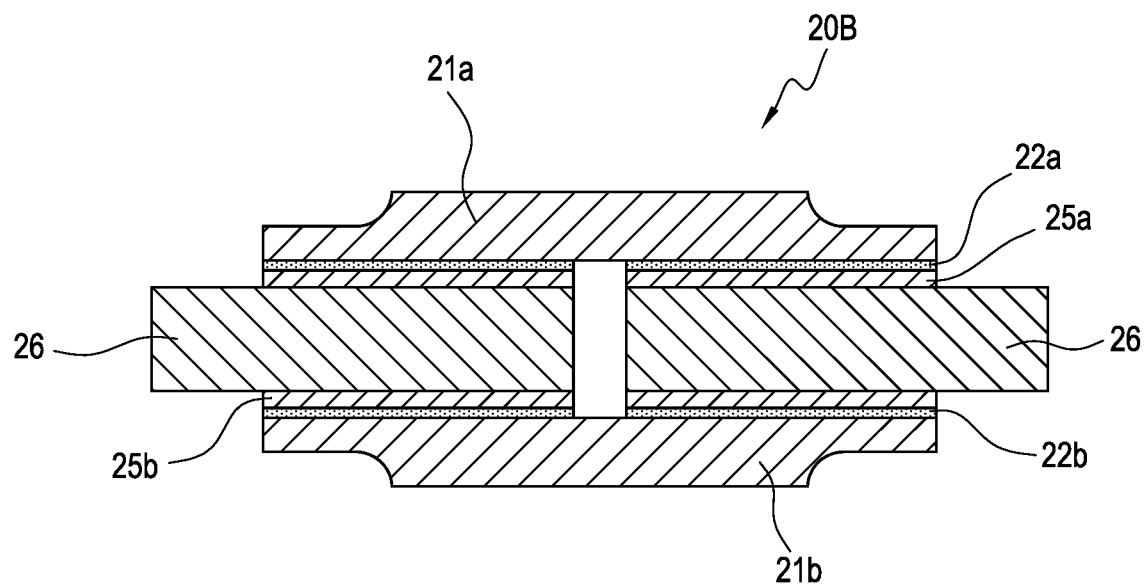
Figure 3:
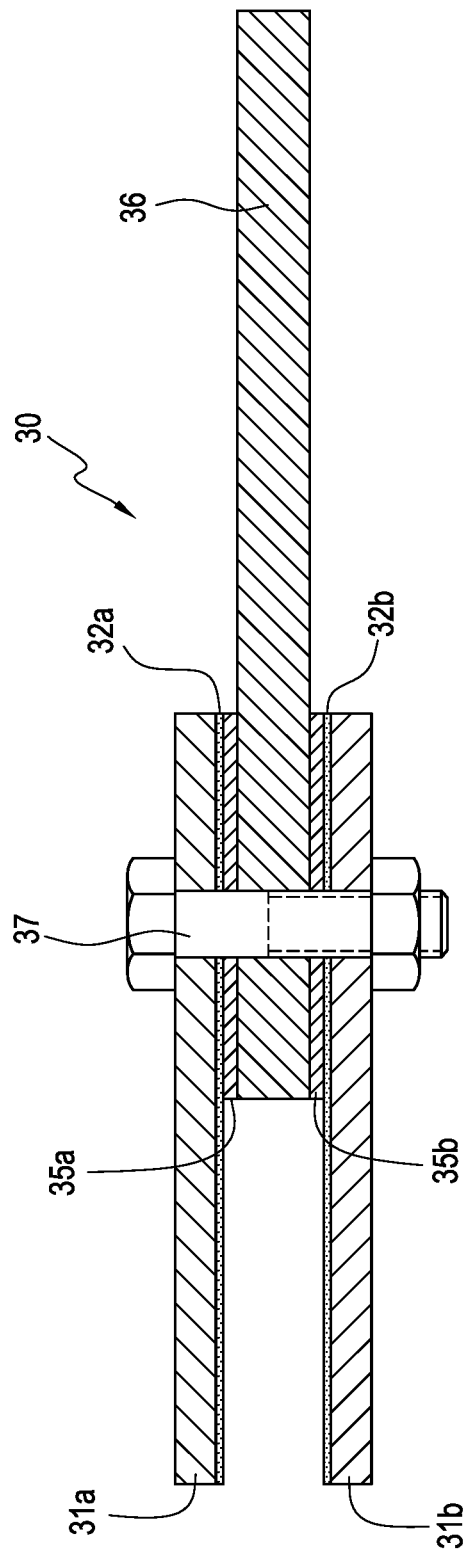
Figure 4:
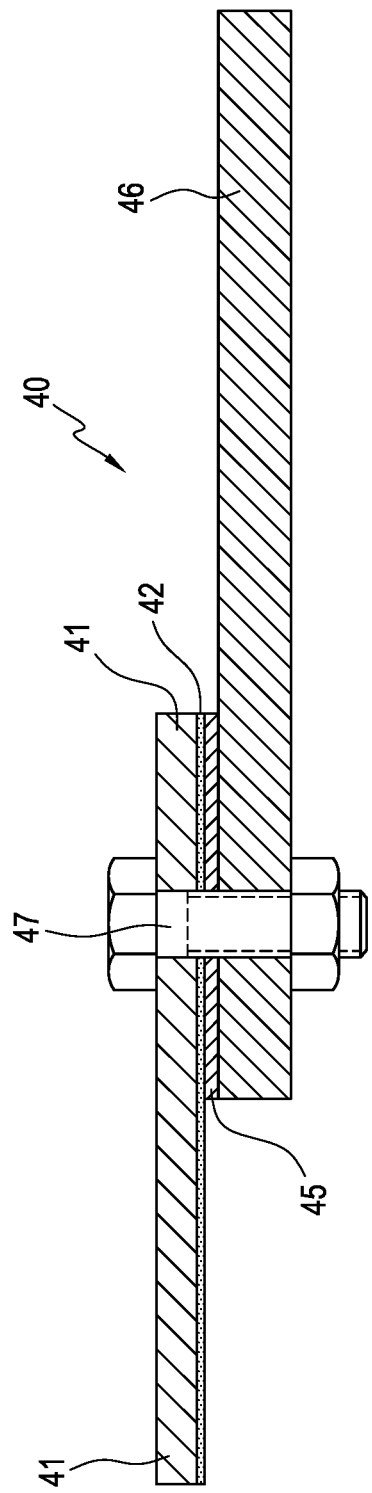
Figure 7:
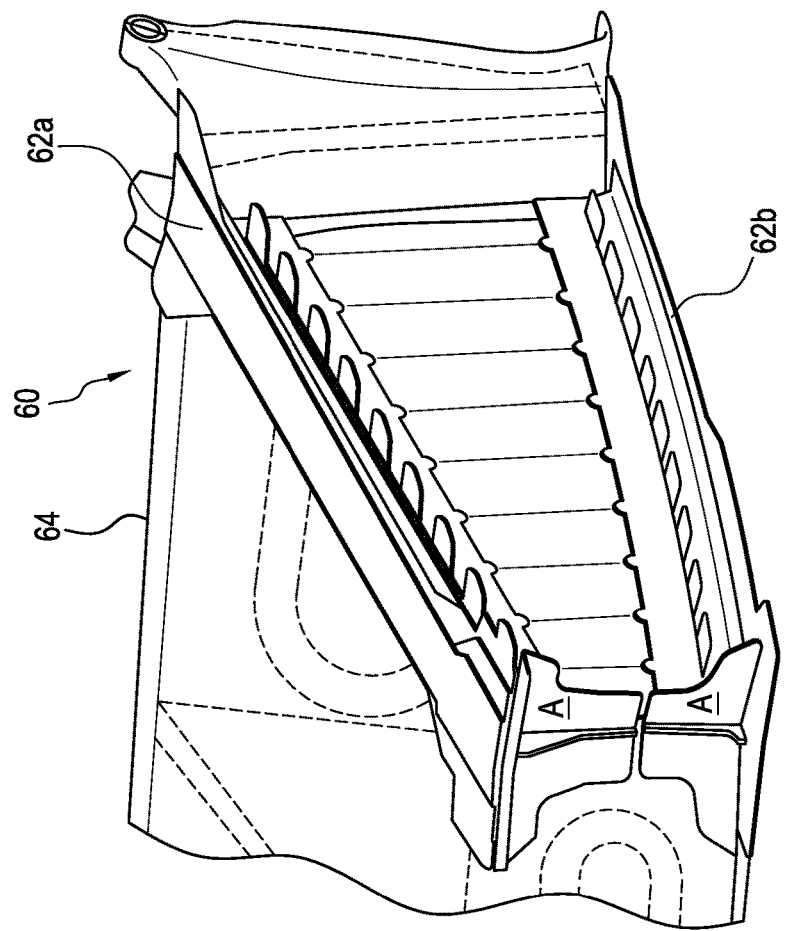
Figure 5:
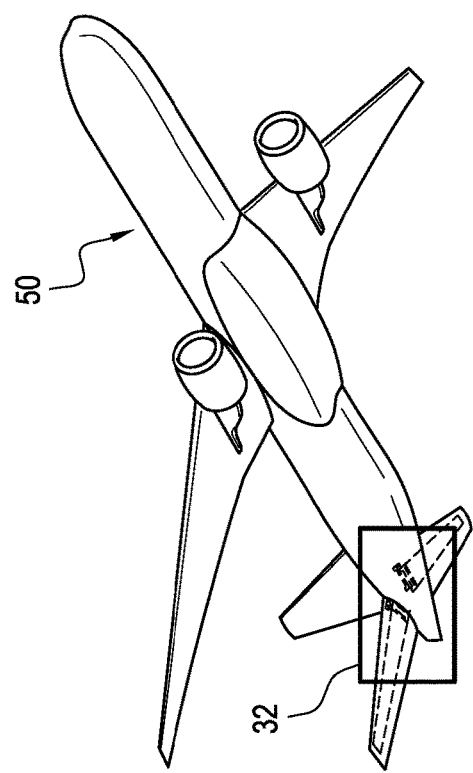
Figure 6:
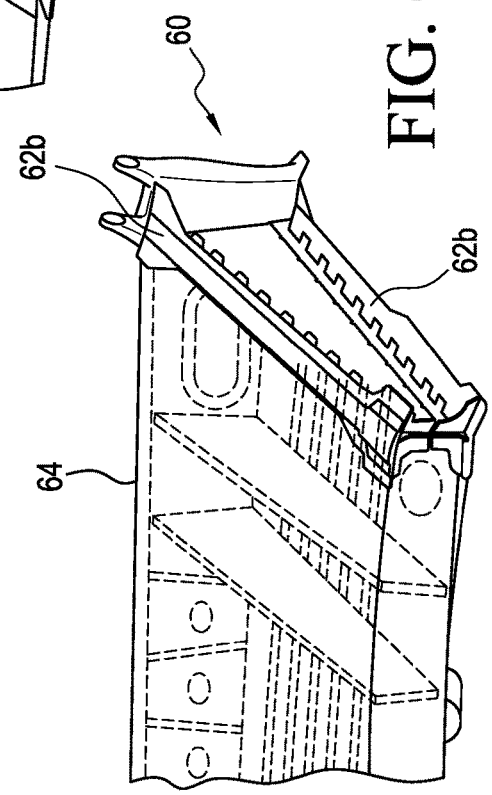

Having thus described variations of the disclosure in general terms, reference will now be made to the accompanying drawings, which are not necessarily drawn to scale, and wherein:

FIG. 1A is a perspective cross-sectional and exploded side view of a prior art joined assembly;

FIG. 1B is a perspective cross-sectional and side view of a prior art horizontal stabilizer assembly;

FIG. 2A is a perspective cross-sectional and exploded side view of a joined assembly according to an aspect of the present disclosure;

FIG. 2B is a perspective cross-sectional side view of a horizontal stabilizer assembly according to an aspect of the present disclosure;

FIG. 3 are perspective cross-sectional side views of a joined assembly according to aspects of the present disclosure;

FIG. 4 are perspective cross-sectional side views of a joined assembly according to aspects of the present disclosure FIG. 5 is an illustration of an aircraft comprising a joined assembly according to an aspect of the present disclosure;

FIG. 6 is a an enlarged exposed view of a joined assembly according to an aspect of the present disclosure and as shown in FIG. 5;

FIG. 7 is an enlarged exposed view of the joined assembly shown in FIG. 6; and

FIGS. 8A, 8B, 9A, 9B, 10A, 10B, 11A and 11B are flowcharts outlining methods according to aspects of the present disclosure.

DETAILED DESCRIPTION

Aircraft assemblies typically join a composite structure to metal structures through the use of various fasteners and metal component parts. In particular, horizontal stabilizer assemblies typically join a composite skin (e.g. horizontal stabilizers) to an aircraft frame through the use of various fastening components, many of which comprise metal fasteners.

As set forth above, aspects of the present disclosure comprise improving adhesion of a metal surface (e.g. titanium and titanium alloy surface) to an epoxy resin by creating a sol-gel film at the interface between the metal and the epoxy resin. A metal-to-resin gradient occurs through a monolayer of organometallic coupling agents.

The present disclosure therefore contemplates improving adhesion of a metal surface (e.g. titanium and titanium alloys) to an epoxy resin by creating a sol-gel layer at the metal/epoxy resin surface, with the sol-gel comprising a mixture of alkoxyzirconium and glycidoxysilane coupling agents. The organometallic compounds react with or bond to both the metal surfaces and an interfacing epoxy resin. Some mechanical interaction may also result from the surface porosity and microstructure. Generally, the zirconium component bonds covalently with the metal while the glycidoxysilane bonds with the epoxy. Thus the sol-gel process orients the sol coating having a metal-to-epoxy gradient on the surface.

A zirconate-silicate sol coating, according to the present disclosure is useful at extended hot/wet conditions because the Zr—O bond that forms between the coating and the metal surface is stronger than a Ti—O bond. Both Zr—O and Ti—O bonds are stronger than Si—O bonds. The higher bond strength prevents dissolution of the oxide layer, so the Zr-component in the sol coating functions as an oxygen diffusion barrier. Hence, a hybrid-coating occurs having Zr and Si to produce a desired metal-to-epoxy gradient needed for good adhesion in structural adhesive bonds. The hybrid coating integrates the oxygen diffusion barrier functions of the Zr (or its alternatives) with an organosilicate network desirable for superior bonding performance.

The contemplated surface treatment for metal surfaces (e.g. titanium and titanium alloys) to be joined to an epoxy resin comprises a sol-gel film adhered to a metal surface to produce a metal surface coating suitable as an interface to improve adhesion between the metal and an epoxy material. The sol-gel film, or sol coating promotes adhesion through a hybrid organometallic coupling agent at the metal surface. A contemplated sol used to produce the sol-gel film comprises a dilute solution of a stabilized alkoxyzirconium organometallic salt, (e.g. tetra-iso-propoxyzirconium or tetra-n-propoxyzirconium) and an organosilane coupling agent (e.g. 3-glycidoxypropyltrimethaoxysilane) with an acetic acid catalyst for aqueous formulations. The sol-gel film is applied by immersing, spraying or drenching the metal in or with the sol without rinsing. Key to the sol-gel film are bonding sites with the metal and separate sites to bond (or otherwise) affiliated with the resin. The sol-gel film produces a gradient changing from the characteristics of metal to those of the epoxy resin-containing compound. Good adhesion results from clean, active metal surfaces with sol coatings that contain the organometallic coupling agents in the proper orientation. After application, the sol coating is dried at ambient temperature or, more commonly, heated to a temperature between ambient and 250F to complete the sol-gel film formation.

Ideally, covalent bonding occurs between the metal surface and a zirconium compound in the sol. Successful bonding requires a clean and chemically active metal surface. The strength and durability of the sol coating depends upon chemical and micro-mechanical interactions at the surface involving, for example, the metal's porosity and microstructure and on the susceptibility of the sol coating to rehydrate. One preferred sol coating provides surface stability for adhesive bonding.

According to aspects of the present disclosure, useful sols are hybrid mixtures of an alkoxyzirconium and glycidoxysilane in a water or alcohol carrier together with an organic acid as a silane catalyst and a zirconium stabilizer. The sol is applied to titanium or a titanium alloy surface to bond the zirconium covalently with the surface and to form a sol-gel by drying the sol on the surface. The glycidoxysilane couples covalently with an epoxy resin-containing material, since the epoxy material has an active epoxy functionality.

Sol coating of metals achieves resin-to-substrate bonding via chemical linkages (covalent bonds, hydrogen bonds, or van der Waals forces) while minimizing environmental impacts otherwise caused by the traditional use of highly diluted hazardous metals. A preferred sol for making the sol coating (also called a sol-gel film) on the metal includes an organozirconium compound (such as tetra-n-propoxyzirconium) to bond covalently to the metal through Zr and an organosilane (such as 3-glycidoxypropyltrimethoxysilane) to bond covalently to the epoxy adhesive (with an acetic acid catalyst in water-based formulations as a catalyst and Zr rate of hydrolysis stabilizer).

In a successful sol-gel surface treatment, the typical failure mode for adhesively bonded specimens in a hot/wet environment is cohesive failure in the organic adhesive layer. In such cases, the sol-gel film is stronger than the bulk adhesive, so the adhesive bond is as strong as possible.

According to aspects of the present disclosure, sol-gel chemistry develops binder coatings to a thickness ranging from about 20 nm to 500 nm producing a gradient from the metallic surface through a hybrid organometallic sol-gel film to the adhesive. Bond strength and durability in our preferred sol coating is increased by including organosilanes and organozirconium compounds. The organosilanes covalently bond to or otherwise associate with the epoxy adhesive. Ideally, covalent bonding also occurs at the interface between the sol-gel and metal surface. Mechanical interactions may also play a role depending on the design (i.e., porosity, microstructure) of the sol coating. Durability of the sol-gel film in humid conditions depends on whether the film rehydrates. If the film is too thick, it becomes glassy.

The term "sol-gel," a contraction of solution-gelation, refers to a series of reactions where a soluble metal species (typically a metal alkoxide or metal salt) hydrolyze to form a metal hydroxide. The soluble metal species usually contain organic ligands tailored to correspond with the resin in the bonded structure. The metal hydroxides condense (peptize) in solution to form an hybrid organic/inorganic polymer. Depending on reaction conditions, the metal polymers may condense to colloidal particles or they may grow to form a network gel. The ratio of organics to inorganics in the polymer matrix is controlled to maximize performance for a particular application.

Many metals are known to undergo sol-gel reactions. Silicon and aluminum sol-gel systems have been studied extensively. Representative sol-gel hydrolysis and condensation reactions, using silicon as an example, are shown in equations (1) and (2).

$$Si(OEt)_4 + 2H_2O \rightarrow Si(OH)_4 + 4\ EtOH \qquad \text{hydrolysis (1)}$$

$$Si(OH)_4 \rightarrow SiO_2 + 2H_2O \qquad \text{condensation (2)}$$

wherein Et is $CH_3CH_2$—. The hydrolysis and condensation reactions can be complete, resulting in complete conversion into the metal oxide or a hydrous metal hydroxide. They can be partial, leaving more of the alkoxide functionalities in the finished gel. Depending upon the reaction conditions, reactions (1) and (2) can produce discrete oxide particulates, as demonstrated in the synthesis of nanoscale particles, or they can form a network gel, which can be exploited in film formation. The solubility of the resulting gel in a solvent will depend upon the size of the particles and degree of network formation.

A clean and chemically active metal surface to bond a sol-gel film from the sol was achieved by spraying, immersing, or drenching. Cleaning is a key factor toward obtaining good adhesion. If the surface is dirty, bonding is blocked by the dirt or occurs between the sol and the dirt rather than between the sol and the surface. Obtaining a chemically active surface is not trivial. Titanium produces a passive oxide surface. A bare, pure titanium surface will immediately oxidize in air or dry oxygen to form a barrier titanium oxide film which has a thickness ranging from about 2 nm to about 4 nm (i.e. about 20 to 40 Å). Titanium surface oxides do not hydrolyze as readily as aluminum surface oxides to form active metal hydroxides. Water will, however, chemisorb onto the surface of the titanium oxide. Aluminum oxidizes as quickly or more quickly in air.

$HNO_3$—HF etching of titanium alloys removes $TiO_2$ alpha case, but creates a smooth surface to which it is difficult to bond. Traditional alkaline etches like TURCO 5578 or OAKITE 160 produce a roughened surface better suited for adhesive bonding, but produce a tenacious smut layer. The smut causes adhesion to be reduced dramatically. Extended soaking in hot $HNO_3$ after the alkaline etch still left some smut. In one process, the surface was rinsed and etched with $HNO_3$—HF, rinsed again, and followed by an alkaline etch. Again after another rinse, the surface was desmutted with BOECLENE once or in multiple stages and produced a clean and active surface suited for adhesive bonding through the sol coating of the present disclosure.

According to aspects of the present disclosure, the formation of a sol-gel film on titanium involves Lewis acid/base interaction of a hydrolyzed zirconium alkoxide, an organosilane, or both in the sol with the titanium oxide surface. Without being bound to any particular theory, this interaction is possibly assisted by chemisorbed water to cause the formation of a coupled Zr—O—Ti or Si—O—Ti linkage and a new Ti—OH bond on the surface. A similar reaction occurs on aluminum. Without being bound to any particular theory, the ability of the metal alkoxides to bond covalently with the metal surface most likely requires more energy in the case of titanium than aluminum. Complete coupling and formation of covalent bonds with titanium alloys may not occur until the part reaches higher temperatures, such as they usually experience during adhesive curing.

Sol-gel chemistry is quite versatile. Reaction conditions (for example, the concentration of reagents or the catalyst type) control the relative rates of the hydrolysis and condensation reactions. Sol-gel solutions can be prepared which readily form thin films or which condense to fine colloidal particles. Starting materials and reaction conditions can produce films with morphology similar to surface coatings achieved with anodize and etch processes. Density, porosity, and microstructure can be tailored by controlling the chemistry of the sol.

Sol-gel condensation reactions are affected by the acid-base character of the metal/oxide surface. The isoelectronic point (IEP, a measure of surface pH) for titanium is more acidic (IEP=6.0) than an aluminum surface (IEP=9.2), which changes the surface chemistry of the metal with the sol.

Screening studies were conducted on test panels of titanium-6Al-4V (Ti-6-4) alloy sized 6"×6"×0.50" initially prepared by degreasing the surface with an aqueous detergent. The panels were then either grit blasted with #180 grit alumina followed by a final aqueous detergent cleaning to minimize the presence of loosely adhered grit or acid etched in a $HNO_3$—HF immersion tank. The sol for these tests consisted of a dilute aqueous mixture of 3-glycidoxypropyltrimethoxysilane (GTMS) and tetra-n-propoxyzirconium (TPOZ) with an acetic acid catalyst. Typically, the panels were dip-coated with a 10 minute immersion time, held under ambient conditions for 15 to 30 minutes, and dried in a 230° F. oven for 15-30 minutes. With the sol coating complete, the specimens were ready for accepting primer and then an epoxy adhesive. We also tested corresponding formulations using alcohol as the carrier or solvent. These epoxy sols typically have a pH around 4-5.

The test specimens were primed with BMS 5-89 chromated adhesive primer (American Cyanamid BR127). Two sol coated panels were then bonded together to form an adhesive lap joint in an autoclave using BMS 5-101 Type II Grade (Dexter-Hysol EA 9628) 250° F. cure epoxy adhesive.

Screening level testing used the ASTM D 3762 Wedge Test with exposure at 140° F. and greater than 95% relative humidity to test the bond strength. The bonded panels were cut into five 1"×6" strip specimens and wedges were driven into the bondline. Progress of the crack along the bondline was measured after the initial driving of the wedge, and after exposure to 140° F. and greater than 95% relative humidity for one hour, 24 hours, one week, and longer. Samples were monitored in the humidity chamber for over 2500 hours total exposure time. Typical test results compared with conventional chromic acid anodizing (CAA).

Additionally, lap shear testing was carried out on panels which showed good wedge crack screening characteristics. Finger panels were primed and lap bonded with the 5-101 adhesive. Measurements were taken at −65° F., room temperature, and 165° F.

A water-based system alleviates many of the flammability, safety, toxicity, and environmental concerns associated with the process when the sol is alcohol-based. We chose a glycidoxysilane (an epoxy) because of its stability in solution and its ability to crosslink with common, aerospace epoxy or urethane (cyanate ester) adhesives. The silane is acid-base neutral (pH≈7.0), so its presence in the sol mixture does not increase the relative hydrolysis and condensation rates of the alkoxides. Sols including the organosilanes are relatively easy to prepare and to apply with reproducible results.

The choice of the organosilane coupling agent was a significant factor in improving hot/wet stability of the BMS epoxy bonding system. The GTMS included an active epoxy group which can react with the bond primer. GTMS did not form strong Lewis acid-base interactions with the hydrated titanium oxide substrate. The titanium oxide surface was more accessible to the zirconium organometallic when GTMS was used, allowing the desired stratification of the sol-gel film in essentially a monolayer with the epoxy groups of the silane coupling agents (or, in some cases, even the zirconium compound) oriented toward the primer. The ideal concentration will depend upon the mode of application. A higher concentration may be preferred for drench or spray applications. This orientation allowed strong covalent bonding to develop between the titanium substrate and zirconia and silica (i.e. M-O-M bonds), as well as maximizing bonding between the epoxy moiety of the GTMS to the epoxy adhesive.

Physical size of the silane coupling agent also has an effect on adhesion. Aluminum studies revealed that both the initial adhesion and hydrolytic stability decreased when epoxycydohexylpropyltrimethoxysilane was used instead of GTMS as the coupling agent. The difference in performance may be attributed to a difference in size of the organic functionality. Without being bound to any particular theory, this size effect is most likely the result of physical interference of both hydrolysis and condensation reactions by the bulky alkyl group attached directly to the silicon. Hydrolysis was incomplete and the silicon hydroxide could not effectively condense with the aluminum surface. These results suggest that the most effective coupling agents for a spray or drench coating application will be smaller so as not to sterically hinder hydrolysis and condensation reactions.

The concentrations of the reactants in the sol were generally determined as volume percentages. In the screening tests, a 2 vol % of GTMS and 1 vol % of TPOZ was used. This concentration corresponds to a molar ratio of silicon to zirconium of 3.7:1. Related studies suggest that a slightly higher concentration of reactants, namely a total of (Si+Zr) =4.4 volume % may yield better results, so the ratio of GTMS to TPOZ might need further adjustment to obtain the optimal performance (strongest surface adherence). A higher adhesion will occur with a mixed (Zr+Si) sol because of the more chemically active Zr.

The organozirconium compound served to minimize the diffusion of oxygen to the surface and to stabilize the metal-resin interface. As a variation to the sol coating process, a stabilizer might be applied to the surface to form a barrier film prior to applying the hybrid organometallic sol to form the sol-gel film.

Alcohol-based sols allow for the precise control the amount of hydrolysis. Optimization of the water-based system, however, actually yielded better hot/wet durability results than the alcohol-based system, as demonstrated by comparing similar alcohol and water-based coatings.

Aging of the sol (i.e. "induction time") is another important factor in using sols according to aspect of the present disclosure. Complete hydrolysis and condensation of the organometallic in the sol-gel film was deemed important to develop a hydrolytically stable metal oxide film in the metal. The presence of hydrolyzable alkoxides in the sol-gel film will have two adverse effects. First, every residual alkoxide represents an incomplete condensation site between the metal and the coupling agents. Incomplete condensation, therefore, decreases the ultimate bond strength of the sol-gel film. Second, in a humid environment, these alkoxide residues can hydrolyze. The structural changes accompanying hydrolysis cause stress in the sol-gel film which, we believe, promotes failure to occur within the sol-gel film or at one of the interfaces (metal/film or film/primer or adhesive).

Aging is a function of the rates of the hydrolysis reaction of the zirconium alkoxides and the organosilane. Tetra-n-propoxyzirconium reacts more rapidly with water or other active hydrogens than the silane. The zirconate hydrolyzes rapidly using ambient moisture and condenses with itself or with absorbed water on the titanium surface. If not properly controlled, this zirconate hydrolysis self-condensation reaction can produce insoluble zirconium oxyhydroxides which will precipitate and become nonreactive.

If, however, the sol is applied too short a time after being made, the organosilane may not be fully hydrolyzed. As the sol ages, the hydrolyzed silicon and zirconium components may condense among themselves, forming oligomers and networks. These networks will eventually become visible to the naked eye and become insoluble. The ideal solution age is at the point that the zirconium and silicon are hydrolyzed sufficiently that zirconium and silicon react with the metal surface. At this point, generally some metal polymers and networks have formed in the sol and they will give the sol-gel film some structure.

The zirconium and silicon components were made to hydrolyze on a similar time scale by mixing the zirconium alkoxide with glacial acetic acid to stabilize the fast reacting four-coordinate zirconate center and to enable a water-based system. This mixing effectively changed the geometric and electronic nature of the zirconium component. The minimum amount of acetic acid necessary was used to form the zirconium-acetic acid complex. Other organic acids, like citric acid, glycols, ethoxyethanol, $H_2N-CH_2-CH_2-OH$, or the like can be substituted for the acetic acid.

Extended X-ray fine structure (EXAFS) analysis was used to interpret the X-ray absorption near edge structures (XANES) identified zirconium polymers in the sol where the terminal alkoxy groups are substituted by acetyl groups. Bridging alkoxide groups existed in an equilibrium placing the Zr-atom in a 6-fold coordination. The zirconium thereafter hydrolyzed more slowly, putting it on a hydrolysis time scale similar to the preferred organosilane. IR measurements indicated that the acetate coordination was monodentate.

The relative rates of the hydrolysis and condensation reactions involved in the sol coating process were controlled by the type of catalyst (either acid or base), the concentrations of the reagents in the reactions, the metal alkoxide selected, and the water available for hydrolysis. An acidic catalyst promoted the hydrolysis reaction over condensation while a basic catalyst does the opposite. The effects of various acidic catalysts were examined, such as acetic acid and nitric acid, and basic catalysts, such as ammonium hydroxide and triethylamine. For these formulations, the basic catalysts promoted the condensation reactions too vigorously, and shortened the pot-life of the solution. Colloidal zirconate-silicate particles precipitated prematurely after the sol was mixed. The nitric acid was effective as a catalyst, but did not stabilize the zirconate via a coordinating ligand like the acetate ion in acetic acid, so aging of the sol produced differing, unpredictable results. Thus, acetic acid was chosen as the catalyst. The sols were diluted to control the self-condensation reactions, thereby extending the pot life, although, the sols must be used soon after they are prepared.

The amount of acetic acid is also significant for the sol, as the acetic acid also functions as a catalyst for the hydrolysis and a stabilizer for the zirconium complex. In general throughout the screening tests, 0.13 moles of glacial acetic acid were added to 0.091 moles of the organosilane before combining the organosilane with the organozirconium. Doubling the amount of acetic acid to 0.26 moles improved bonding performance; tripling the amount to 0.39 moles did not improve bonding performance. It is further thought that less acetic acid is best for formulations to be used in the manufacture of sensitive aircraft parts and components.

Metal surfaces were cleaned using abrasive blasting or acid etching with $HNO_3$—HF in both liquid and paste form. Since the sol reacts directly with chemical moieties on the substrate surface, adhesion is sensitive to surface precleaning. Residue (dirt) or smut resulting from the cleaning process can drastically effect the adhesive bond performance, as the dirt and smut are relatively loosely adhered to the metal surface.

FIG. 1A, shows a schematic perspective representation of a cross-sectional side view of a representative prior art horizontal stabilizer assembly joint 10A. First and second titanium structures 11a and 11b are shown having various coatings applied thereto. The first and second titanium structure 11a, 11b as shown have their outer surfaces respectively covered by primer coating 12a, 12b. The primer coatings 12a, 12b are shown covered by an adhesive coating 13a, 13b. A fiberglass layer 14a, 14b is shown adhered to adhesive layers 13a, 13b respectively. A composite material skin 16 is shown sandwiched between first and second moldable plastic shims (MPSs) 15a, 15b. The MPSs 15a, 15b are shown sandwiched between fiberglass layers 14a, 14b respectively. In this assembly 10A, therefore, the composite material skin is secured between first and second titanium structures 11a, 11b with moldable plastic shims 15a, 15b placed therebetween along with fiberglass layers 14a, 14b in attempt to achieve a desired and predetermined degree of securely fastening the composite material skin to the first and second titanium structures. As shown, the titanium structure may be splice plates that join together via additional fasteners (e.g. bolts, etc.) that are not shown in FIG. 1A.

FIG. 1B shows a schematic perspective representation of a cross-sectional side view of a representative prior art horizontal stabilizer assembly joint 10B. First and second titanium structures 11a and 11b are shown having various coatings applied thereto. The first and second titanium structure 11a, 11b as shown have their outer surfaces respectively covered by a primer coating 12a, 12b. The primer coatings 12a, 12b are shown covered by an adhesive coating 13a, 13b. a fiberglass layer 14a, 14b is shown adhered to adhesive layers 13a, 13b respectively. A composite material skin 16 is shown sandwiched between first and second moldable plastic shims (MPSs) 15a, 15b. The MPSs 15a, 15b are shown sandwiched between fiberglass layers 14a, 14b respectively. In this assembly 10B therefore, the composite material skin is secured between first and second titanium structures 11a, 11b with moldable plastic shims 15a, 15b placed therebetween along with fiberglass layers 14a, 14b in attempt to achieve a desired and predetermined degree of securely fastening the composite material skin to the first and second titanium structures. As shown, the titanium structure may be splice plates that join together via additional fasteners (e.g. bolts, etc.) that are not shown in FIG. 1B.

FIG. 2A shows a schematic perspective representation of a cross-sectional side view of a representative horizontal stabilizer assembly joint 20A, according to an aspect of the present disclosure. First and second titanium structures 21a and 21b are shown having various coatings applied thereto. The first and second titanium structure 21a, 21b as shown have their outer surfaces respectively covered respectively by a sol-gel coating 22a, 22b. The sol-gel coatings 22a, 22b are shown respectively covered by a primer coating 23a, 23b. As shown in FIG. 2A, a composite material skin 26 is shown sandwiched between first and second moldable plastic shims (MPSs) 25a, 25b. In assembly 20A, therefore, the composite material skin 26 is secured between first and second titanium structures 21a, 21b with moldable plastic shims 25a, 25b placed therebetween. As shown in FIG. 2A a desired and predetermined degree of securely fastening the composite material skin to the first and second titanium structures is achieved without the use of any intervening fiberglass layers, such as those shown in FIGS. 1A and 1B. As shown in FIG. 2A, the first and second titanium structures 22a, 22b may be splice plates that join together via additional fasteners (e.g. bolts, etc.) that are not shown in FIG. 2A.

FIG. 2B shows a schematic perspective representation of a cross-sectional side view of a representative horizontal stabilizer assembly joint 20B. First and second titanium structures 21a and 21b are shown having various coatings applied thereto. The first and second titanium structure 21a, 21b as shown have their outer surfaces respectively covered by a sol-gel coating 22a, 22b. A composite material skin 26 is shown sandwiched between first and second moldable plastic shims (MPSs) 25a, 25b. In assembly 20B, therefore, the composite material skin 26 is secured between first and second titanium structures 21a, 21b with moldable plastic shims 25a, 25b placed therebetween in attempt to achieve a desired and predetermined degree of securely fastening the composite material skin to the first and second titanium structures. As shown, the first and second titanium structures 22a, 22b may be splice plates that join together via additional fasteners (e.g. bolts, etc.) that are not shown in FIG. 2B.

FIG. 3 shows a schematic perspective representation of a cross-sectional side view of a portion of a representative horizontal stabilizer assembly joint 30. First and second titanium structures 31a and 31b are shown having various coatings applied thereto. The first and second titanium structure 31a, 31b as shown have their outer surfaces respectively covered by a sol-gel coating 32a, 32b. A composite material skin 36 is shown sandwiched between first and second moldable plastic shims (MPSs) 35a, 35b. In assembly 30, therefore, the composite material skin 36 is secured between first and second titanium structures 31a, 31b with moldable plastic shims 35a, 35b placed therebetween in attempt to achieve a desired and predetermined degree of securely fastening the composite material skin to the first and second titanium structures. As shown, the first and second titanium structures 31a, 31b may be splice plates that join together via a bolt assembly 37.

FIG. 4 shows a schematic perspective representation of a cross-sectional side view of a portion of a further contemplated representative horizontal stabilizer assembly joint 40. First titanium structure 41 is shown having various coatings applied thereto. First titanium structure 41 as shown has one surface covered by a sol-gel coating 42. In assembly joint 40, therefore, the composite material skin 46 is secured to first titanium structure 41 with moldable plastic shim 45 placed therebetween to achieve a desired and predetermined degree of securely fastening the composite material skin 46 to the first titanium structure 41. As shown, the titanium structure 41 may be splice plate or other structure that secures a composite material (e.g. a composite skin component) to an aircraft frame via a fastener such as the shown bolt assembly 47. FIG. 4 therefore illustrates aspects of the present disclosure where a composite component, such as a composite material skin 46 is secured to a single metal (e.g. titanium, titanium alloy) component having a sol-gel coating and a single moldable plastic shim in a joint assembly, as opposed to a "sandwiched' joint orientation between first and second metal components as shown in FIG. 3 and other FIGs. herein.

FIG. 5 is a representative illustration of an aircraft 50 with box 52 highlighting the region 52 of the horizontal stabilizer assembly.

FIG. 6 is an enlarged and exposed view of a portion of the horizontal stabilizer assembly 60 showing a front spar 64 joined to an external splice—upper panel (plate) 62a, an external splice plate—lower splice panel (plate) 62b and "A" external splice rear spar.

FIG. 7 is a further enlarged view of an exposed portion of horizontal stabilizer assembly 60 shown in FIGS. 5 and 6. FIG. 7 shows the joining of front spar 64 joined to an external splice—upper panel (plate) 62a and an external splice plate—lower panel (plate) 62b, and "A" external splice rear spar.

FIGS. 8A, 8B, 9A, 9B, 10A, 10B, 11A and 11B provide flowcharts outlining methods according to aspects of the present disclosure. According to one aspect, FIG. 8A outlines a method 80a for joining a titanium structure to a composite structure comprising 81 exposing a first titanium structure surface; 83 applying a sol-gel layer to a first titanium structure surface; 85 positioning a composite structure first surface proximate to and at predetermined distance from the first titanium structure surface comprising the first sol-gel layer; and 86 positioning a predetermined amount of epoxy-containing compound between the sol-gel layer on the first titanium structure surface and a composite structure first surface. For each of FIGS. 8A, 9A, 10A, 11A, the present disclosure further contemplates applying and positioning the predetermined layer of epoxy-containing compound to the sol-gel layer on the titanium structure surface before, concurrently with, or after the step 85 of positioning the composite structure first surface proximate to and at a predetermined distance from the first titanium structure surface that comprises the sol-gel layer. That is, the epoxy-containing compound may be spread across the sol-gel layer prior to positioning the composite structure surface proximate to and at a predetermined distance from the sol-gel layer on the titanium structure surface, or the epoxy-containing compound may be positioned (e.g. injected) between the sol-gel coated titanium structure and the composite structure after step 85.

Figure 8A:
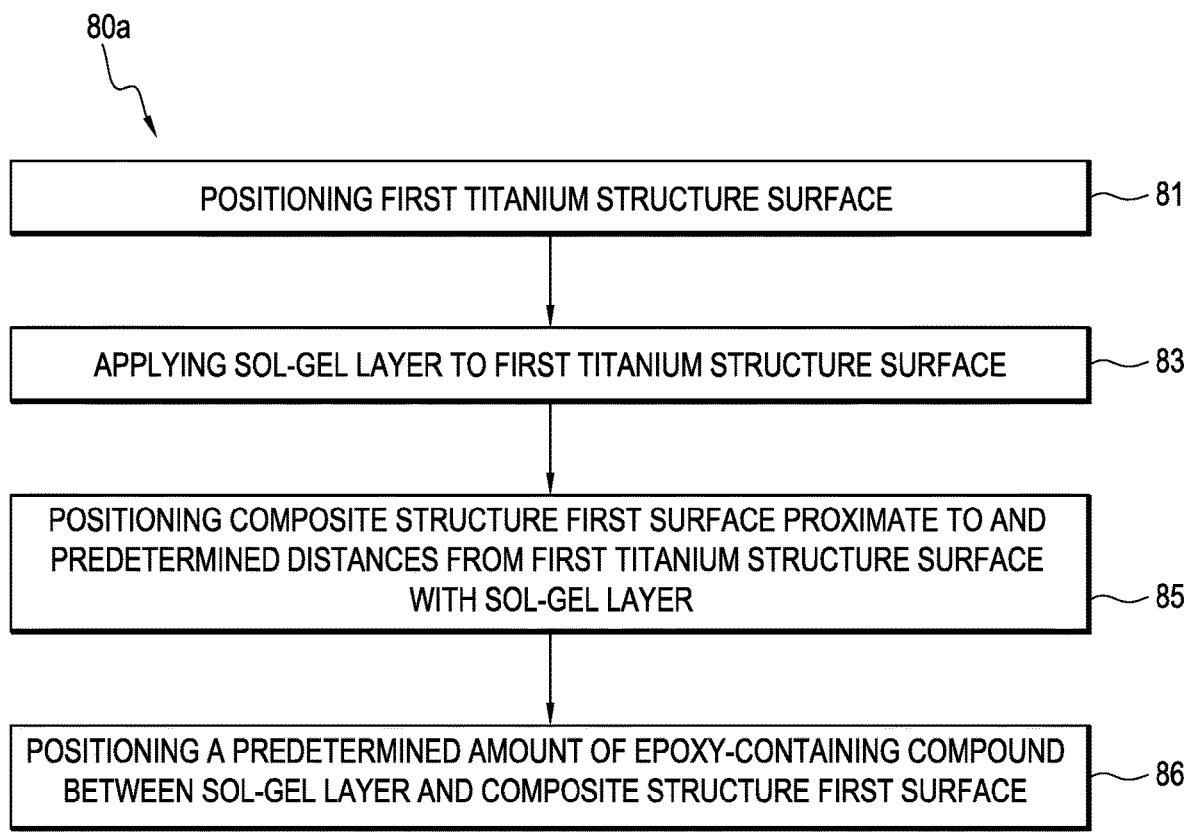
Figure 8B:
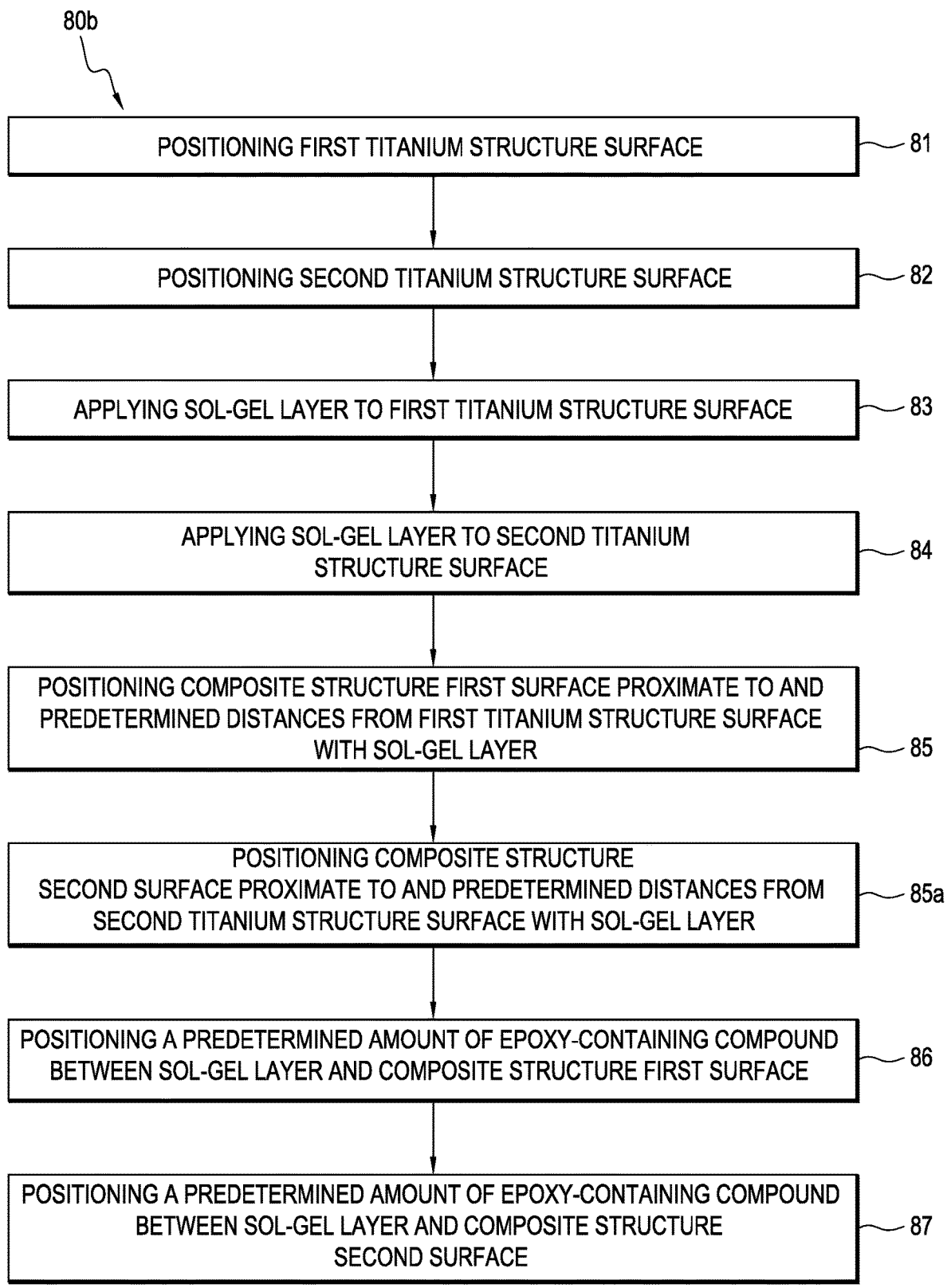

FIG. 8B outlines a further aspect of the present disclosure. According to one aspect, FIG. 8B outlines a method 80b comprising 81 exposing a first titanium structure surface; 82 exposing a second titanium structure; 83 applying a first sol-gel layer to a first titanium structure surface; 84 applying a sol-gel layer to the second titanium structure surface; 85 positioning a composite structure first surface proximate to and at predetermined distances from the first titanium structure surface comprising the first sol-gel layer; 85*a* positioning a composite structure second surface proximate to and at predetermined distances from the second titanium structure surface comprising a sol-gel layer; 86 positioning a predetermined amount of epoxy-containing compound between the sol-gel layer on the first titanium structure surface and a composite structure first surface; and 87 positioning a predetermined amount of epoxy-containing compound between sol-gel layer and a composite structure second surface. It is understood that the methods outlined in FIGS. 8A and 8B contemplate and comprise combining steps 81 and 83 and steps 82 and 84 such that the first and second titanium structures are provided with the sol-gel coating already applied thereto. For each of FIGS. 8B, 9B, 10B and 11B, the present disclosure further contemplates applying and positioning the predetermined layer of epoxy-containing compound to the sol-gel layer on the titanium structure surfaces before, concurrently with, or after the steps 85, 85*a* of respectively positioning the composite structure first and second surface proximate to and at a predetermined distance from the first and second titanium structure surfaces that comprise the sol-gel layer. That is, the epoxy-containing compound may be spread across the sol-gel layers prior to positioning the composite structure first and second surfaces proximate to and at a predetermined distance from the sol-gel layers on the first and second titanium structure surfaces, or the epoxy-containing compound may be positioned (e.g. injected) between the first and second sol-gel coated titanium structure surfaces and the first and second composite structure surfaces (e.g. after steps 85, 85*a*).

Figure 9A:
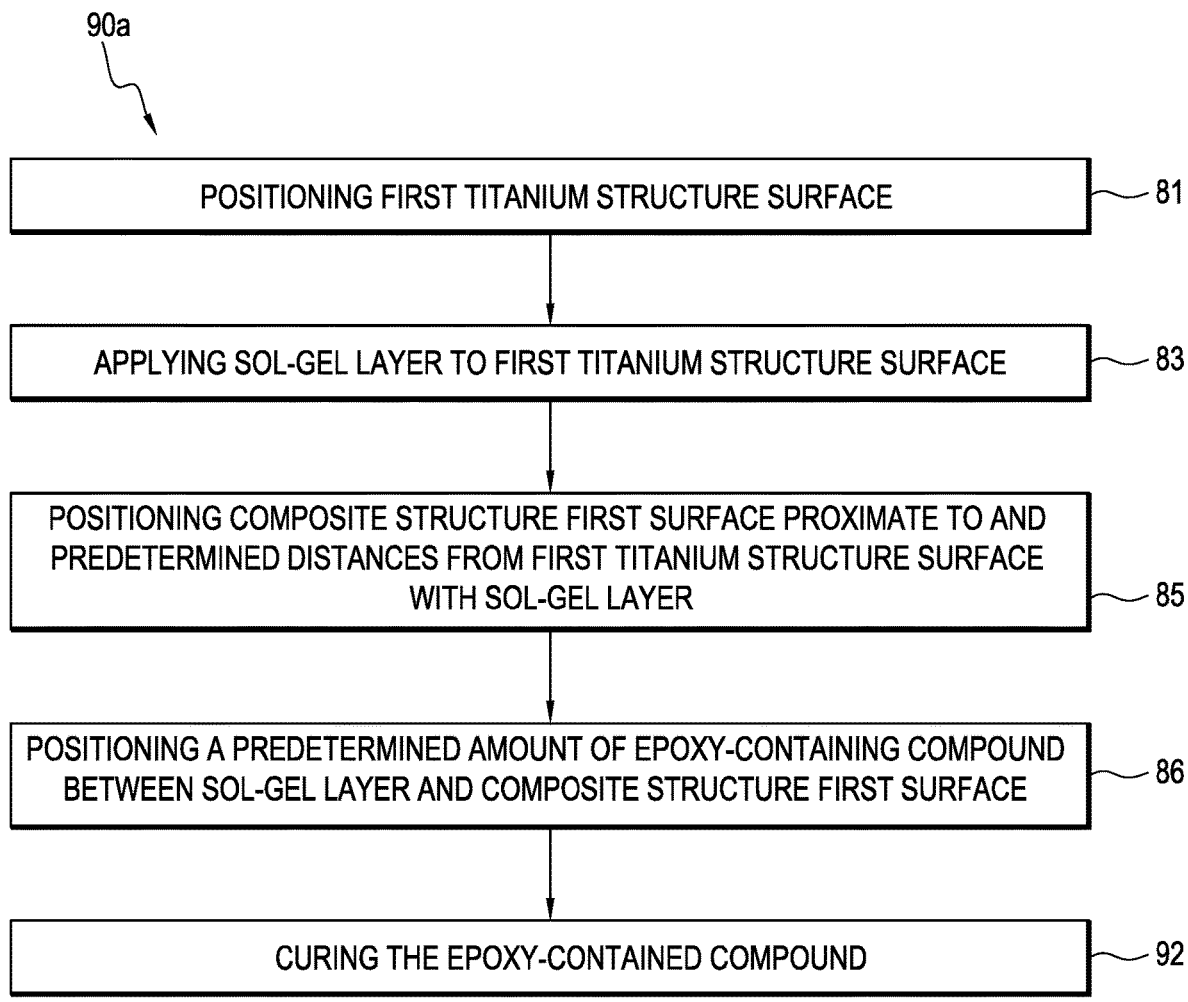

FIG. 9A outlines a method 90*a* for joining a titanium structure to a composite structure comprising 81 exposing a first titanium structure surface; 83 applying a sol-gel layer to a first titanium structure surface; 85 positioning a composite structure first surface proximate to and at predetermined distances from the first titanium structure surface comprising the first sol-gel layer; 86 positioning a predetermined amount of epoxy-containing compound between the sol-gel layer on the first titanium structure surface and a composite structure first surface; and 92 curing the epoxy-containing compound.

Figure 9B:
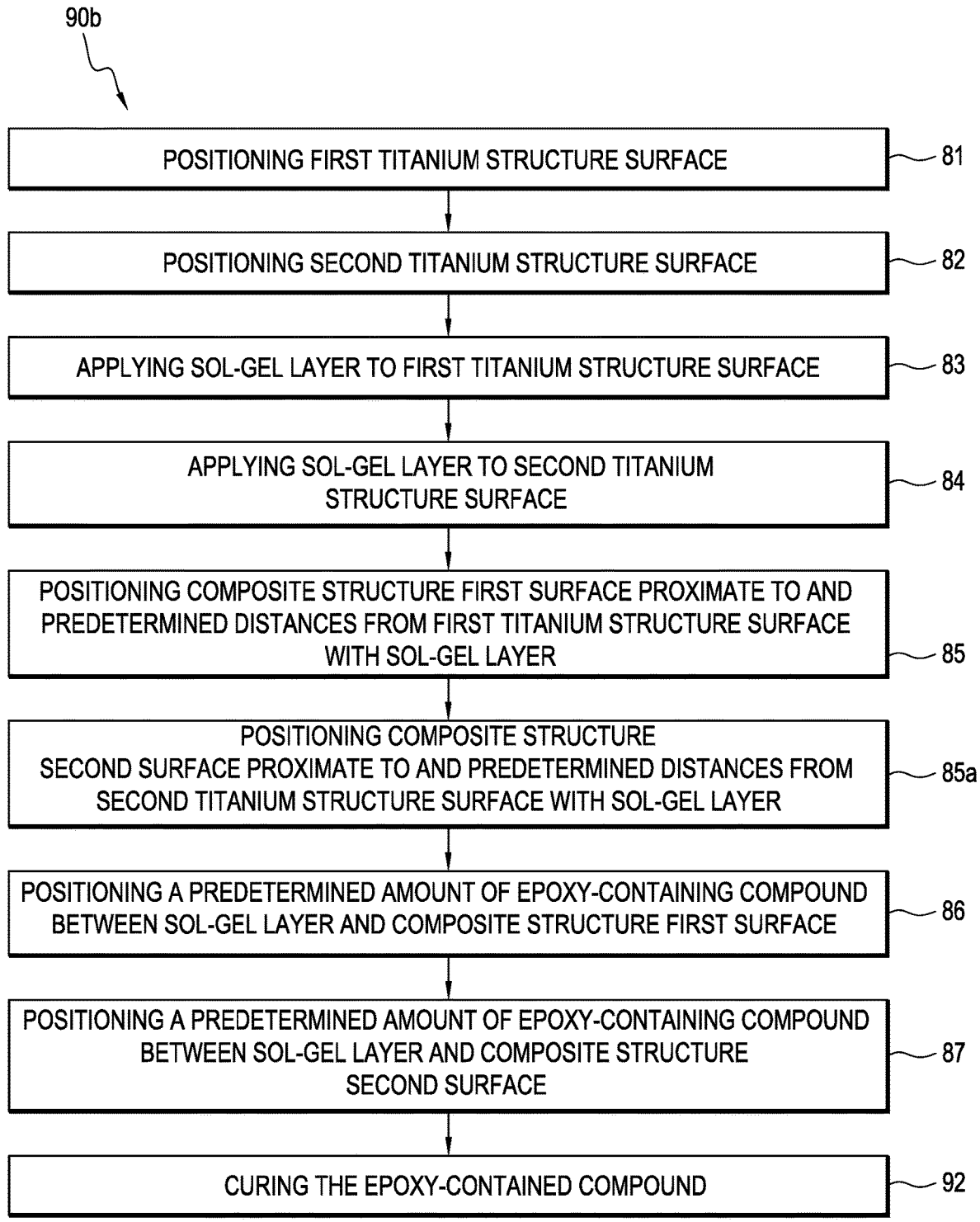

FIG. 9B outlines a further aspect of the present disclosure wherein the method 90*b* comprises 81 exposing a first titanium structure surface; 82 exposing a second titanium structure; 83 applying a first sol-gel layer to a first titanium structure surface; 84 applying a sol-gel layer to the second titanium structure surface; 85 positioning a composite structure first surface proximate to and at predetermined distances from the first titanium structure surface comprising the first sol-gel layer; 85*a* positioning a composite structure second surface proximate to and at predetermined distances from the second titanium structure surface comprising a sol-gel layer; 86 positioning a predetermined amount of epoxy-containing compound between the sol-gel layer on the first titanium structure surface and a composite structure first surface; 87 positioning a predetermined amount of epoxy-containing compound between sol-gel layer and a composite structure second surface; and 92 curing the epoxy-containing compound. It is understood that the methods outlined in FIGS. 9A and 9B contemplate and comprise combining steps 81 and 83 and steps 82 and 84 such that the first and second titanium structures are provided with the sol-gel coating already applied thereto.

Figure 10A:
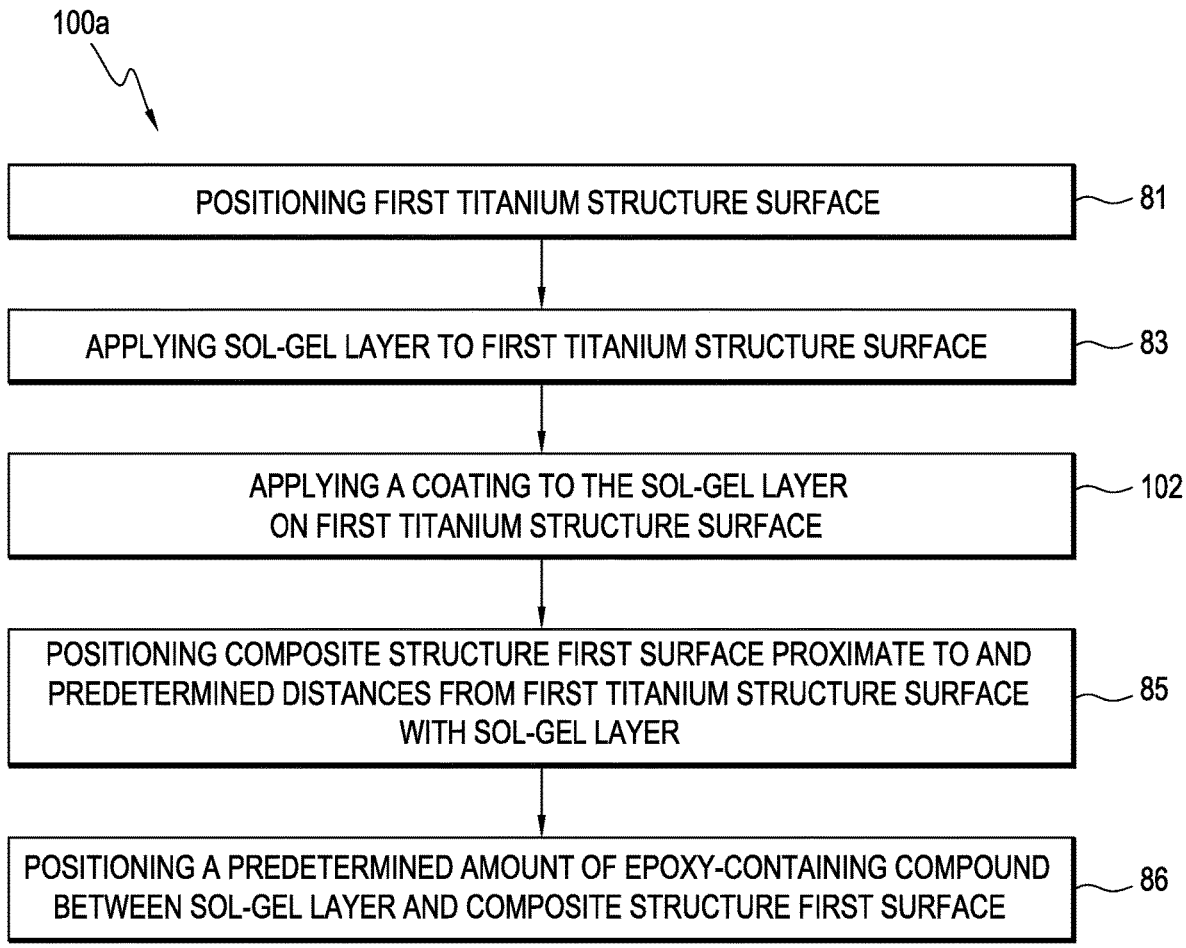

According to another aspect, FIG. 10A outlines a method 100*a* for joining a titanium structure to a composite structure comprising 81 exposing a first titanium structure surface; 83 applying a sol-gel layer to a first titanium structure surface; 102 applying a coating to the sol-gel layer on the first titanium substrate surface; 85 positioning a composite structure first surface proximate to and at predetermined distances from the first titanium structure surface comprising the sol-gel layer; and 86 positioning a predetermined amount of epoxy-containing compound between the sol-gel layer on the first titanium structure surface and a composite structure first surface.

Figure 10B:
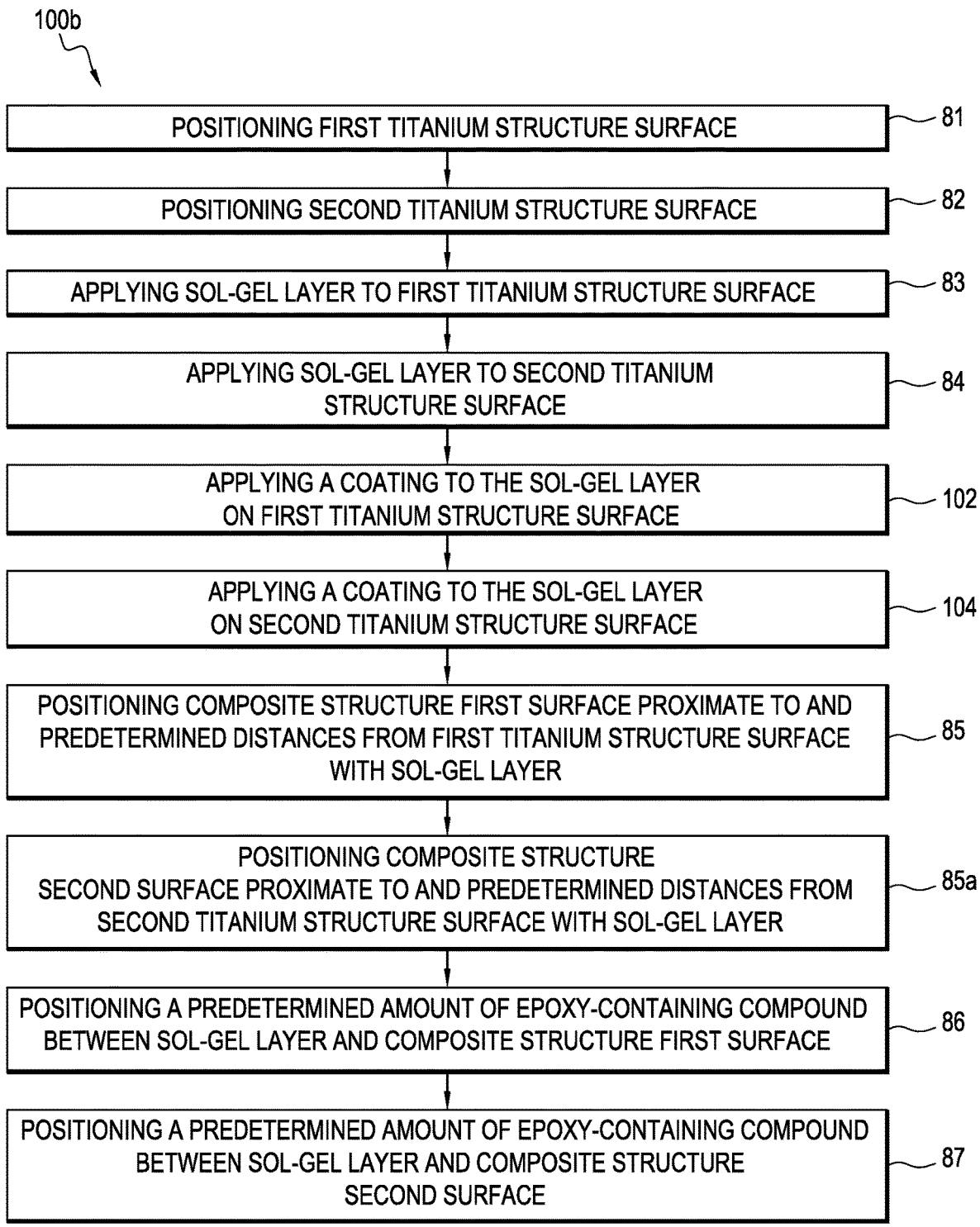

FIG. 10B outlines a method 100*b* comprising 81 exposing a first titanium structure surface; 82 exposing a second titanium structure; 83 applying a first sol-gel layer to a first titanium structure surface; 84 applying a sol-gel layer to the second titanium structure surface; 102 applying a coating to the sol-gel layer on the first titanium substrate surface; 104 applying a coating to the sol-gel layer on the second titanium substrate surface; 85 positioning a composite structure first surface proximate to and at predetermined distances from the first titanium structure surface comprising the first sol-gel layer; 85*a* positioning a composite structure second surface proximate to and at predetermined distances from the second titanium structure surface comprising a sol-gel layer; 86 positioning a predetermined amount of epoxy-containing compound between the sol-gel layer on the first titanium structure surface and a composite structure first surface; and 87 positioning a predetermined amount of epoxy-containing compound between sol-gel layer and a composite structure second surface. It is understood that the methods outlined in FIGS. 10A and 10B contemplate and comprise combining steps 81 and 83 and steps 82 and 84 such that the first and second titanium structures are provided with the either or both of the sol-gel layer and/or the coating (e.g. primer coating) already applied thereto.

Figure 11A:
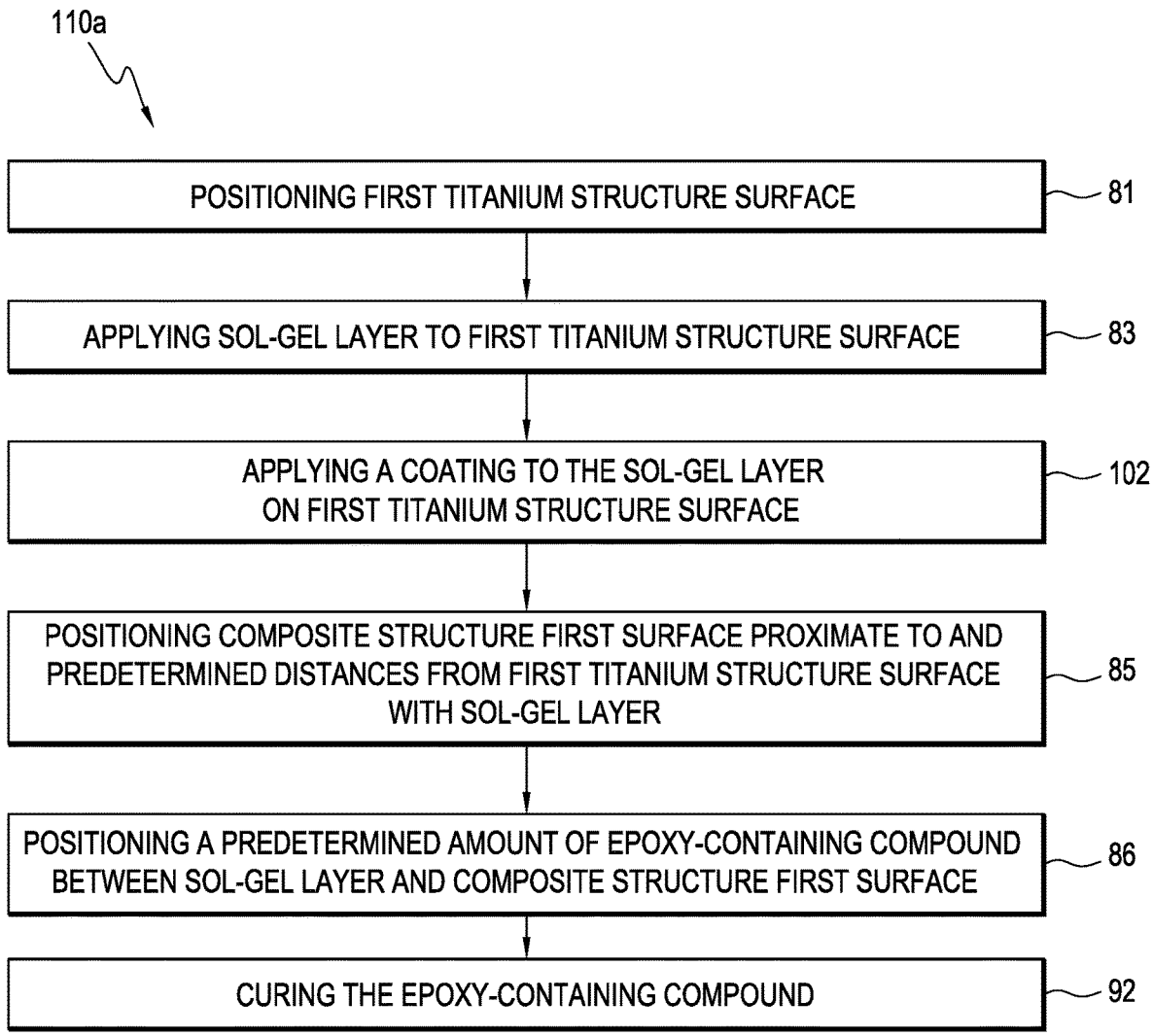

FIG. 11A outlines a method 110*a* for joining a titanium structure to a composite structure comprising 81 exposing a first titanium structure surface; 83 applying a sol-gel layer to a first titanium structure surface; 102 applying a coating to the sol-gel layer on the first titanium substrate surface; 85 positioning a composite structure first surface proximate to and at predetermined distances from the first titanium structure surface comprising the sol-gel layer; 86 positioning a predetermined amount of epoxy-containing compound between the sol-gel layer on the first titanium structure surface and a composite structure first surface; and 92 curing the epoxy-containing compound.

Figure 11B:
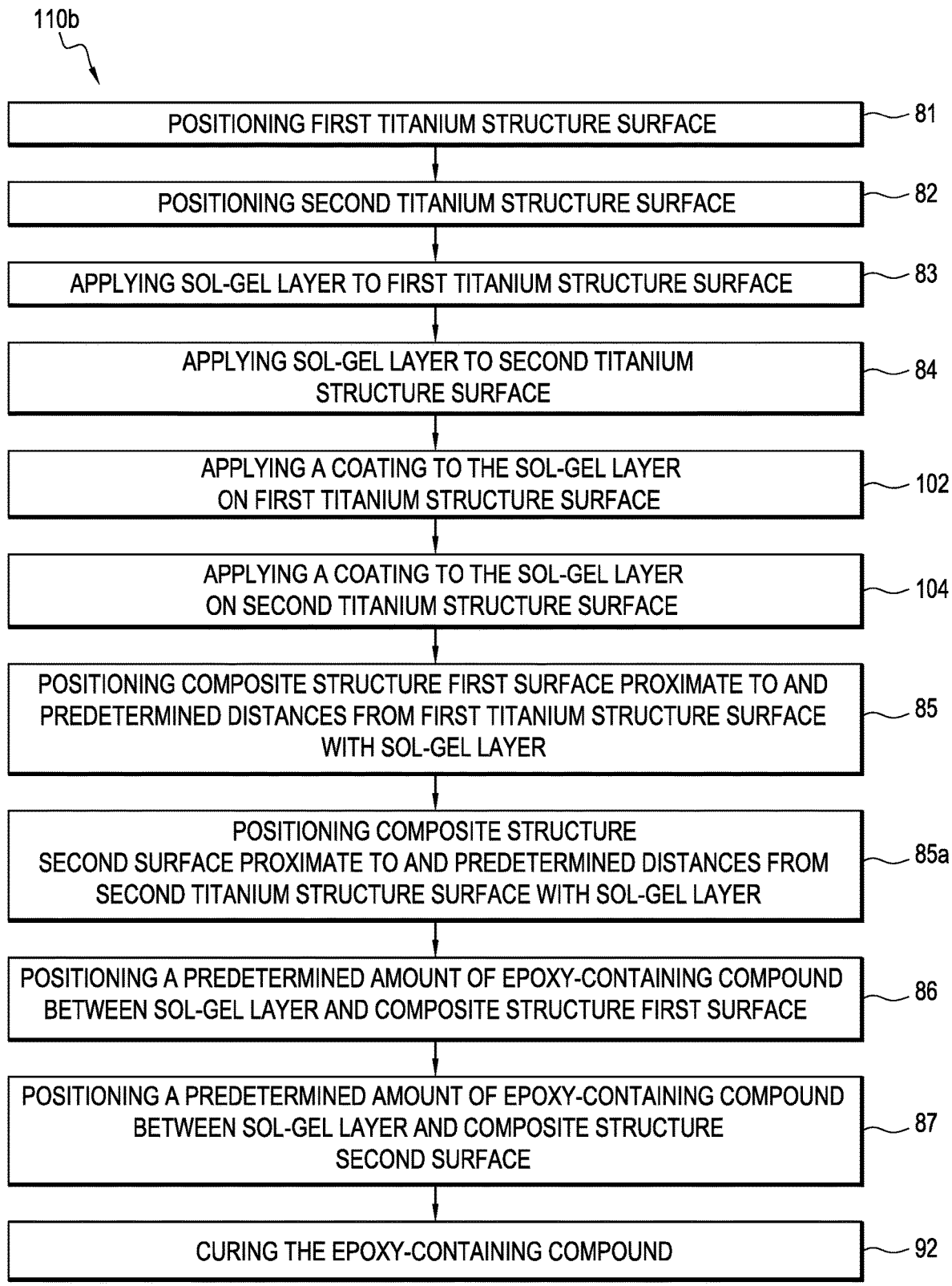

FIG. 11B outlines a further aspect of the present disclosure wherein the method 110*b* comprises 81 exposing a first titanium structure surface; 82 exposing a second titanium structure; 83 applying a first sol-gel layer to a first titanium structure surface; 84 applying a sol-gel layer to the second titanium structure surface; 102 applying a coating to the sol-gel layer on the first titanium substrate surface; 104 applying a coating to the sol-gel layer on the second titanium substrate surface; 85 positioning a composite structure first surface proximate to and at predetermined distances from the first titanium structure surface comprising the first sol-gel layer; 85*a* positioning a composite structure second surface proximate to and at predetermined distances from the second titanium structure surface comprising a sol-gel layer; 86 positioning a predetermined amount of epoxy-containing compound between the sol-gel layer on the first titanium structure surface and a composite structure first surface; 87 positioning a predetermined amount of epoxy-containing compound between sol-gel layer and a composite structure second surface; and 92 curing the epoxy-containing compound. It is understood that the methods outlined in FIGS. 11A and 11B contemplate and comprise combining steps 81 and 83 and steps 82 and 84 such that the first and second titanium structures are provided with the either or both of the sol-gel layer and/or the coating (e.g. primer coating) already applied thereto.

Some of the assemblies on which aspects of the present disclosure are useful include high load bearing assemblies on vehicle, including, without limitation, vehicles that include, without limitation aircraft, spacecraft, rotorcraft, missiles, satellites, terrestrial vehicles, waterborne vehicles, etc. Such contemplated load-bearing assemblies include, without limitation, horizontal stabilizer assemblies for aircraft. In such assemblies, a layer of epoxy-containing material such as, for example, an epoxy-containing resin is introduced to fill any potential gap that could occur in areas where a composite component, such as a composite skin would be joined (e.g. mechanically) to a high strength metal fastening assembly (e.g. titanium splice plates). Such gaps are understood to be bounded by acceptable manufacturing tolerances of such assemblies. According to aspects of the present disclosure, the acceptable tolerance for gaps occurring between composite skins and fasteners (areas where moldable plastic shims comprising epoxy-containing materials would be used) is less than about 0.040". Therefore the moldable plastic shims for use in horizontal stabilizer assemblies are contemplated as ranging in thickness from about 0.000" to about 0.040".

Representative epoxy materials that find utility as moldable plastic shims, according to aspects of the present disclosure include, without limitation, those epoxies covered by Grade 120 and 190 epoxy systems commercially available, for example, as Dexter EA 9377, EA 9394, EA 9394S (Henkel Corp.), etc. Such epoxies finding utility for shimming joined components, such as those listed immediately above are typically two-part epoxy resin systems. Such two-part systems can comprise for example, a "Part A" resin and a "Part B" hardener. Such systems may be mixed according to correct mix ratios and may be prepackaged into base and catalyst containers (or separate chambers, for example, separated by a diaphragm within a single container) with the base and catalyst components released and brought into contact with one another and eventually cured to form the moldable plastic shim. Such epoxy compounds for use as the moldable plastic shim material can be cured at ambient conditions (curing time ranging from about 4 to about 16 hours depending on the desired or required hardness required), or may have their curing time accelerated by providing heat ranging from about 120° F. to about 190° F. (curing time ranging from about 1 to about 3 hours depending on the grade of epoxy material selected.

The metal components useful as high strength components useful in the high load bearing applications according to aspects of the present disclosure include, without limitation, metals that are often difficult to coat or treat including, without limitation, titanium and titanium alloys. Such metal components include, for example, titanium and titanium alloy splice plates that are used in aircraft subassemblies (e.g. horizontal stabilizer assemblies) to directly or indirectly join composite components to aircraft frames. The present disclosure therefore contemplates as useful metals in connection with aspects of the present disclosure, titanium metal and titanium alloys, including, without limitation, Ti-6Al-4V; Ti-15V-3Cr-3Sn-3Al; Ti-15Mo-3Al-3Nb, etc.

According to aspects of the present disclosure, composite material useful as composite skins comprise epoxy resin containing materials that comprise a fiber component and an epoxy resin component that are then formed through tooling and curing to form the finished composite material. The contemplated fibers incorporated into the composite skin materials include, without limitation, carbon fibers, boron fibers, aramid fibers, polyolefin fibers, ceramic fibers, etc.

According to still further aspects, the joining methods disclosed as well as the components so joined may comprises additional of coating materials including, for example and without limitation primers. When it is desired to overcoat a metal that has been treated with the disclosed sol-gel coatings to improve metal component adhesion to a substrate such as, for example, a composite skin material, it is understood that it has now been found that such primer overcoat of the sol-gel layer does not adversely impact the adhesion of the metal component to the composite skin component. Contemplated primers include, without limitation, those primers comprising epoxy-containing components such as, for example solvent-based chromated Cytec BR 127 (Cytec Solvay Group); non-chromated water-based Cytec XBR 6757, etc. Such primers may be desired to impart desired attributes such as, for example, corrosion inhibition.

EXAMPLES

Testing was performed to determine the effects of using sol-gel applied to titanium surfaces (splice plates) as a bonding agent for epoxy-containing compounds used as moldable plastic shims (MPSs) in horizontal stabilizers joints. The samples were assembled to represent two configurations: (1) sol-gel bonded to the MPS directly and (2) a layer of adhesive primer oriented between the sol-gel and the MPS. Samples were run of the MPS bonded with sol-gel joint for a fatigue load with hot and cold conditions. All specimens were Kevlar-cycled to thermally stress the joint. The tests were run to 500,000 cycles. Samples were run at 17 ksi stress levels in the titanium splice plates, representative of an aircraft joint (i.e. 29,700 lbs max pull). The samples were evaluated throughout the testing for possible loss of preload through the use of instrumented bolts.

The samples were conditioned via Kevlar cycling before the fatigue test. The samples were cycles from −65° F. to 160° F. for 2000 cycles. The chamber used was a Thermotron chamber, with HP data acquisition units models 34970A and 34901A, and a pressure transducer 8530C-50. The samples were fatigues with loads of 3500 lbs tension, while cycling the temperature from −65 F to 160 F. The fatigue instrument was a MTS 810 test frame with MTS FlexTest thermocouple (MTS, Eden Prairie, Minn.). The thermocouples used were Doric 400 thermocouples (Doric Instruments, San Diego, Calif.) and an Omega 650 thermocouple (Omega Engineering). The thermos controller was a MTS793 EcoSystem Thermal Controller for a FlexTest 40.

The load on the bolts was measured with a Schatz 1-bolt ultrasonic load measurement system (Schatz USA, Holly, Mich.) when the coupons were fabricated, after Kevlar cycling, and after fatigue testing. Over the course of the testing, the edge fasteners lost more clamp-up than the inside fasteners. There was no significant difference between the base line, the MPS190/sol-gel/Ti and the MPS120/sol-gel/Ti samples.

After the bolt load was measured, the samples were disassembled and inspected. It was expected that the MPS would crack or crumble; a result that could result in premature joint failure. However, no cracking or disbanding was observed. It was therefore determined that, after Kevlar cycling and fatigue testing, all samples MPS/sol-gel/Ti and MPS/primer/sol-gel/Ti samples passed without failure.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, bridge trusses, support columns and structures, general construction objects, etc. Further structures and objects include vehicles, such as, without limitation, aircraft, satellites, rockets, missiles, etc., and therefore further include manned and unmanned aircraft, manned and unmanned spacecraft, manned and unmanned rotorcraft, manned and unmanned terrestrial vehicles, manned and unmanned non-terrestrial vehicles, manned and unmanned surface and sub-surface water-borne vehicles, objects, and structures. Particularly contemplated components include aircraft stringer, spars, ribs, as well as components comprising other planar and non-planar geometries used in the manufacture of aircraft components and parts, etc.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof. When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of joining a metal component to a cured composite component to form an assembly, said method comprising:
    positioning a first metal component, said first metal component comprising a first titanium structure, said first titanium structure comprising a first titanium structure surface, said first titanium structure surface comprising a first sol-gel layer;
    positioning a cured composite component, said cured composite component comprising a cured composite component first surface and a cured composite component second surface, said cured composite component first surface positioned adjacent to said first metal component;
    positioning a predetermined amount of an epoxy-containing compound between the first sol-gel layer on the first titanium structure surface and the cured composite component first surface;
    bonding the epoxy-containing compound to the first titanium structure surface; and
    joining the first metal component to the cured composite component first surface to form the multi-layer structure.

2. The method of claim 1, wherein, before the step of positioning a first titanium structure, further comprising:
    applying a sol-gel layer to the first titanium structure surface.

3. The method of claim 1, wherein, before the step of positioning a cured composite component, further comprising:
    applying a coating to the first sol-gel layer on the first titanium structure surface.

4. The method of claim 3, wherein, in the step of applying a coating to the sol-gel layer, the coating comprises an epoxy-containing compound.

5. The method of claim 1, further comprising:
    curing the epoxy-containing compound.

6. The method of claim 5, wherein, in the step of curing the epoxy-containing compound, the curing is conducted at a temperature ranging from about 120° F. to about 140° F.

7. The method of claim 1, wherein, in the step of positioning a cured composite component adjacent to said first titanium structure surface the cured composite component comprises at least one of: carbon fiber, glass fiber, boron fiber, aramid fiber, polyolefin fiber, ceramic fiber, and combinations thereof.

8. The method of claim 1, wherein, in the step of positioning a predetermined amount of an epoxy-containing compound between the first sol-gel layer and the cured composite component first surface, said epoxy-containing compound comprises a Grade 120 epoxy system or a Grade 190 epoxy system.

9. The method of claim 1, wherein, in the steps of positioning a predetermined amount of epoxy-containing compound between the first sol-gel layer and the composite structure first surface, the epoxy-containing compound forms a moldable plastic shim.

10. The method of claim 1, wherein, in the step of positioning a cured composite component adjacent to said first metal component, the cured composite component comprises a cured epoxy resin.

11. The method of claim 1, wherein, said first titanium structure comprises a splice plate component.

12. The method of claim 1, wherein, after the step of positioning a first titanium structure, further comprising:
    positioning a second titanium structure comprising a second titanium structure surface, said second titanium structure surface comprising a second sol-gel layer;
    positioning a cured composite component, said cured composite component comprising a cured composite component first surface and a cured composite component second surface, said cured composite component first surface positioned proximate to and a predetermined distance from said first titanium structure surface, and said cured composite component second surface positioned proximate to and at a predetermined distance from said second titanium structure surface;
    positioning a predetermined amount of an epoxy-containing compound between the second sol-gel layer on the second titanium structure surface and the cured composite component structure second surface; and joining the cured composite component structure between the first titanium structure and the second titanium structure to form a multi-component structure.

13. The method of claim 12, wherein, in the steps of positioning the first titanium structure and the second titanium structure, said first titanium structure surface comprising a first sol-gel layer and said second titanium structure surface comprising a second sol-gel layer, said first and second sol-gel layers comprising:
a dilute aqueous mixture of alkoxyzirconium, free of alcohol, for covalently bonding to the first titanium structure and the second titanium structure through the zirconium to form a metal-to-organic interface on the first and second titanium structure surfaces;
an organosilane coupling agent dissolved in the aqueous mixture;
an organic acid catalyst; and
a predetermined amount of ammonia or ammonium.

14. The method of claim 12, wherein, before the step of positioning a second titanium structure, further comprising:
applying a sol-gel layer to the second titanium structure surface.

15. The method of claim 12, wherein, in the steps of positioning the first and second titanium structures, the first and second titanium structures comprise: titanium, titanium alloys, or combinations thereof.

16. An assembly comprising:
a first metal component, said first metal component comprising a first titanium structure, said first titanium structure comprising a first titanium structure surface:
a sol-gel layer applied to the first titanium structure surface of the metal component;
an amount of an epoxy-containing compound applied to the sol-gel layer;
a cured composite component, said cured composite component comprising a composite component first surface and a cured composite component second surface, said cured composite component positioned adjacent the first metal component; and
wherein the first metal component is joined to the cured composite component to form an assembly.

17. The assembly of claim 16, wherein the amount of an epoxy-containing compound is bonded to the first metal component.

18. The assembly of claim 16, wherein said first metal component comprises a splice plate.

19. The assembly of claim 16, wherein the metal component comprises at least one of:
titanium, a titanium alloy, and combinations thereof.

20. The assembly of claim 16, wherein the cured composite component comprises at least one of:
carbon fiber, glass fiber, boron fiber, aramid fiber, polyolefin fiber, ceramic fiber, and combinations thereof.

21. The assembly of claim 16, wherein the cured composite component comprises an epoxy resin.

22. The assembly of claim 16, wherein, the epoxy-containing compound forms a moldable plastic shim.

23. The assembly of claim 16, further comprising a coating on the sol-gel layer.

24. The assembly of claim 23, wherein the coating comprises a primer.

25. The assembly of claim 16 further comprising:
a second metal component, said second metal component comprising a second titanium structure surface; said cured composite component second surface positioned adjacent to said second metal component;
a sol-gel layer applied to the second titanium structure surface of the second metal component; and
an amount of an epoxy-containing compound positioned between the sol-gel layer applied to the second titanium structure surface of the second metal component and the cured composite component second surface.

26. The assembly of claim 25, wherein the sol-gel layer comprises:
an aqueous mixture of alkoxyzirconium, free of alcohol for covalently bonding the first metal component and the second metal component though the zirconium to form a metal-component to-organic material interface on the first and second metal components;
an organosilane coupling agent dissolved in the aqueous mixture;
an organic acid catalyst; and
an amount of ammonia or ammonium hydroxide.

27. The assembly of claim 25, wherein at least one of the first metal component and the second metal component comprise splice plates.

28. A stationary object comprising the assembly of claim 16.

29. A vehicle comprising the assembly of claim 16.

30. The vehicle of claim 29, wherein the vehicle is selected from the group consisting of: a manned aircraft; an unmanned aircraft; a manned spacecraft; an unmanned spacecraft; a manned rotorcraft; an unmanned rotorcraft; a missile; a rocket; a manned terrestrial vehicle; an unmanned terrestrial vehicle; a manned surface water-borne vehicle; an unmanned surface water-borne vehicle; a manned sub-surface water-borne vehicle; and an unmanned sub-surface water-borne vehicle.

31. A joined structure comprising the assembly of claim 16.

32. A horizontal stabilizer assembly comprising;
a first metal component, said first metal component comprising a first titanium structure comprising a first titanium structure surface;
at least one sol-gel layer adhered to the first titanium structure surface;
a cured composite component, said cured composite component oriented adjacent to said first metal component;
an epoxy-containing compound oriented between the sol-gel layer and the cured composite component; and
wherein the first metal component and the cured composite component are joined to form a horizontal stabilizer assembly joint in a horizontal stabilizer assembly.

33. The horizontal stabilizer assembly of claim 32, wherein said first metal component comprises a splice plate.

34. The horizontal stabilizer assembly of claim 32, wherein the cured composite component comprises at least one of:
carbon fiber, glass fiber, boron fiber, aramid fiber, polyolefin fiber, ceramic fiber, and combinations thereof.

35. The horizontal stabilizer assembly of claim 32, wherein the cured composite component comprises an epoxy resin.

36. The horizontal stabilizer assembly of claim 32, wherein, the epoxy-containing compound forms a moldable plastic shim.

37. The horizontal stabilizer assembly of claim 32, further comprising a coating layer, said coating layer oriented between the sol-gel layer and the cured composite component.

38. The horizontal stabilizer assembly of claim 32, further comprising:

a second metal component, said second metal component comprising a second titanium structure comprising a second titanium structure surface;

at least one sol-gel layer adhered to the second titanium structure surface;

a cured composite component, said cured composite component positioned adjacent to said second metal component;

an epoxy-containing compound oriented between the sol-gel layer on the second metal component and the cured composite component;

wherein the first metal component and the second metal component are joined to the cured composite component to form a joint in a horizontal stabilizer assembly.

39. The horizontal stabilizer assembly of claim 38, further comprising:

a coating adhered to the sol-gel layer.

40. The horizontal stabilizer assembly of claim 39, wherein the coating adhered to the sol-gel layer comprises a primer.

41. A joined structure comprising the horizontal stabilizer assembly of claim 32.

42. A vehicle comprising the horizontal stabilizer assembly of claim 32.

43. The vehicle of claim 42, wherein the vehicle is selected from the group consisting of: a manned aircraft; an unmanned aircraft; a manned spacecraft; an unmanned spacecraft; a manned rotorcraft; an unmanned rotorcraft; a missile; a rocket; a manned terrestrial vehicle; an unmanned terrestrial vehicle; a manned surface water-borne vehicle; an unmanned surface water-borne vehicle; a manned sub-surface water-borne vehicle; and an unmanned sub-surface water-borne vehicle.

* * * * *